(12) United States Patent
Namuduri et al.

(10) Patent No.: US 12,374,893 B2
(45) Date of Patent: Jul. 29, 2025

(54) METHOD AND APPARATUS FOR INTEGRATED BI-DIRECTIONAL CHARGING

(71) Applicant: GM Global Technology Operations LLC, Detroit, MI (US)

(72) Inventors: Chandra S. Namuduri, Troy, MI (US); Rashmi Prasad, Troy, MI (US); Suresh Gopalakrishnan, Troy, MI (US); Yilun Luo, Ann Arbor, MI (US); Khorshed Mohammed Alam, Canton, MI (US); Minh-Khai Nguyen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 18/339,606

(22) Filed: Jun. 22, 2023

(65) Prior Publication Data
US 2024/0429713 A1    Dec. 26, 2024

(51) Int. Cl.
*H02J 3/32* (2006.01)
*B60L 50/60* (2019.01)
*B60L 53/24* (2019.01)
*B60L 55/00* (2019.01)
*H02J 7/02* (2016.01)
*H02M 7/797* (2006.01)

(52) U.S. Cl.
CPC .............. *H02J 3/322* (2020.01); *B60L 50/60* (2019.02); *B60L 53/24* (2019.02); *B60L 55/00* (2019.02); *H02J 7/02* (2013.01); *H02M 7/797* (2013.01); *B60L 2210/30* (2013.01); *B60L 2210/40* (2013.01); *H02J 2207/20* (2020.01)

(58) Field of Classification Search
CPC .......... H02J 3/322; H02J 7/02; H02J 2207/20; B60L 55/00; B60L 50/60; B60L 53/24; B60L 2210/30; B60L 2210/40; H02M 7/797
See application file for complete search history.

(56) References Cited

U.S. PATENT DOCUMENTS

| | | | |
|---|---|---|---|
| 2010/0097031 A1* | 4/2010 | King ....................... | B60L 53/14 320/109 |
| 2020/0298722 A1* | 9/2020 | Smolenaers ............. | H02J 7/345 |
| 2022/0402390 A1* | 12/2022 | Smolenaers ............. | H02J 3/322 |
| 2023/0278441 A1* | 9/2023 | Wilson ..................... | B60L 53/24 701/22 |

OTHER PUBLICATIONS

DE Office Action for German Patent Application No. 10 2023 127 169.5, dated Jan. 3, 2024; 5 pages.

* cited by examiner

*Primary Examiner* — Zoheb S Imtiaz
(74) *Attorney, Agent, or Firm* — CANTOR COLBURN LLP

(57) ABSTRACT

An electric vehicle includes a drive system that performs a method of transferring power between a vehicle and an external location. The drive system includes a battery, a rectifier, and a processor. The rectifier is one of a two-level rectifier and a multi-level rectifier. The processor is configured to connect the rectifier between an alternating current (AC) port of an outlet of an external location and the battery. The rectifier is configured to convert between an AC power at the AC port on an external side of the rectifier and a direct current (DC) power at a vehicle side of the rectifier in order to transfer power bi-directionally between the external location and the battery.

20 Claims, 21 Drawing Sheets

METHOD AND APPARATUS FOR INTEGRATED BI-DIRECTIONAL CHARGING

INTRODUCTION

The subject disclosure relates to connections between electric vehicles and power grids and, in particular, to a system and method for transferring power bi-directionally between an electric vehicle and a power grid.

An electric vehicle requires charging from time to time. Charging stations are available for charging the electric vehicle using alternating current (AC) and direct current (DC). Circuitry that accommodates both types of charging stations can take up space. Accordingly, it is desirable to provide an efficient and small circuit that can accommodate both types of charging.

SUMMARY

In one exemplary embodiment, a method of transferring power between a vehicle and an external location is disclosed. A rectifier is connected between an alternating current (AC) port of an outlet of the external location, wherein the rectifier is one of a two-level rectifier and a multi-level rectifier. The rectifier makes a conversion between an AC power at the AC port on an external side of the rectifier and a direct current (DC) power at a vehicle side of the rectifier to transfer power bi-directionally between the external location and the vehicle.

In addition to one or more of the features described herein, the vehicle further includes a first inverter, a winding machine, and a second inverter for DC power transfer, the method further comprising connecting the rectifier to the first inverter to use the first inverter, the winding machine, and the second inverter for AC power transfer wherein the first inverter is one of a two-level inverter and a multi-level rectifier and the second inverter is one of a two-level rectifier and a multi-level rectifier. The method further includes disconnecting the rectifier from the AC port and connecting the first inverter to a DC port of the outlet for DC power transfer. The winding machine is an electric motor of the vehicle and the method further comprises disengaging the electric motor from the vehicle for power transfer. The method further includes connecting a drive system of the vehicle between the AC port and the first inverter and using an inverter of the drive system as the rectifier and a machine winding of the drive system as an inductor. The method further includes transferring the power with the rectifier in one of a three-phase configuration and a single-phase configuration.

In another exemplary embodiment, a drive system of an electric vehicle is disclosed. The drive system includes a battery, a rectifier, and a processor. The rectifier is one of a two-level rectifier and a multi-level rectifier. The processor is configured to connect the rectifier between an alternating current (AC) port of an outlet of an external location and the battery. The rectifier is configured to convert between an AC power at the AC port on an external side of the rectifier and a direct current (DC) power at a vehicle side of the rectifier in order to transfer power bi-directionally between the external location and the battery.

In addition to one or more of the features described herein, the drive system further includes a first inverter, a winding machine and a second inverter for DC power transfer wherein the processor is further configured to connect the rectifier between the AC port and the first inverter to allow AC power transfer using the first inverter, the winding machine, and the second inverter, wherein the first inverter is one of a two-level inverter and a multi-level inverter and the second inverter is one of a two-level inverter and a multi-level inverter. The processor is further configured to disconnect the rectifier from the AC port and connect the first inverter to a DC port of the outlet to allow DC power transfer. The winding machine is an electric motor of the vehicle and the processor is further configured to disengage the electric motor from the vehicle for power transfer. The drive system further includes a second drive system located in series between the AC port and first inverter, wherein an inverter of the second drive system is used as the rectifier and a machine winding of the second drive system is used as an inductor between the AC port and the rectifier and the inverter of the second drive system is one of a two-level inverter and a multi-level inverter. The rectifier is operated in one of a three-phase configuration and a single-phase configuration. A neutral node for the second inverter is located at one of between two capacitors isolating the neutral node from a positive bus and a negative bus of the battery and between a first sub-battery and a second sub-battery connected in series. The winding machine includes a battery side winding and a grid side winding and a turn ratio between the battery side winding and the grid side winding is adjustable to a selected value.

In another exemplary embodiment, an electric vehicle is disclosed. The electric vehicle includes a battery, a rectifier, and a processor. The rectifier is one of a two-level rectifier and a multi-level rectifier. The processor is configured to connect the rectifier between an alternating current (AC) port of an outlet of an external location and the battery. The rectifier is configured to convert between an AC power at the AC port on an external side of the rectifier and a direct current (DC) power at a vehicle side of the rectifier in order to transfer power bi-directionally between the external location and the battery.

In addition to one or more of the features described herein, the electric vehicle further includes a first inverter, a winding machine and a second inverter for DC power transfer wherein the processor is further configured to connect the rectifier between the AC port and the first inverter to allow AC power transfer using the first inverter, the winding machine, and the second inverter, wherein the first inverter is one of a two-level inverter and a multi-level inverter and the second inverter is one of a two-level inverter and a multi-level inverter. The processor is further configured to disconnect the rectifier from the AC port and connect the first inverter to a DC port of the outlet to allow DC power transfer. The winding machine is an electric motor of the vehicle and the processor is further configured to disengage the electric motor from the vehicle for power transfer. The electric vehicle further includes a drive system located in series between the AC port and the first inverter, wherein an inverter of the drive system is used as the rectifier and a machine winding of the drive system is used as an inductor between the AC port and the rectifier and the inverter of the drive system is one of a two-level inverter and a multi-level inverter. The rectifier is operated in one of a three-phase configuration and a single-phase configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
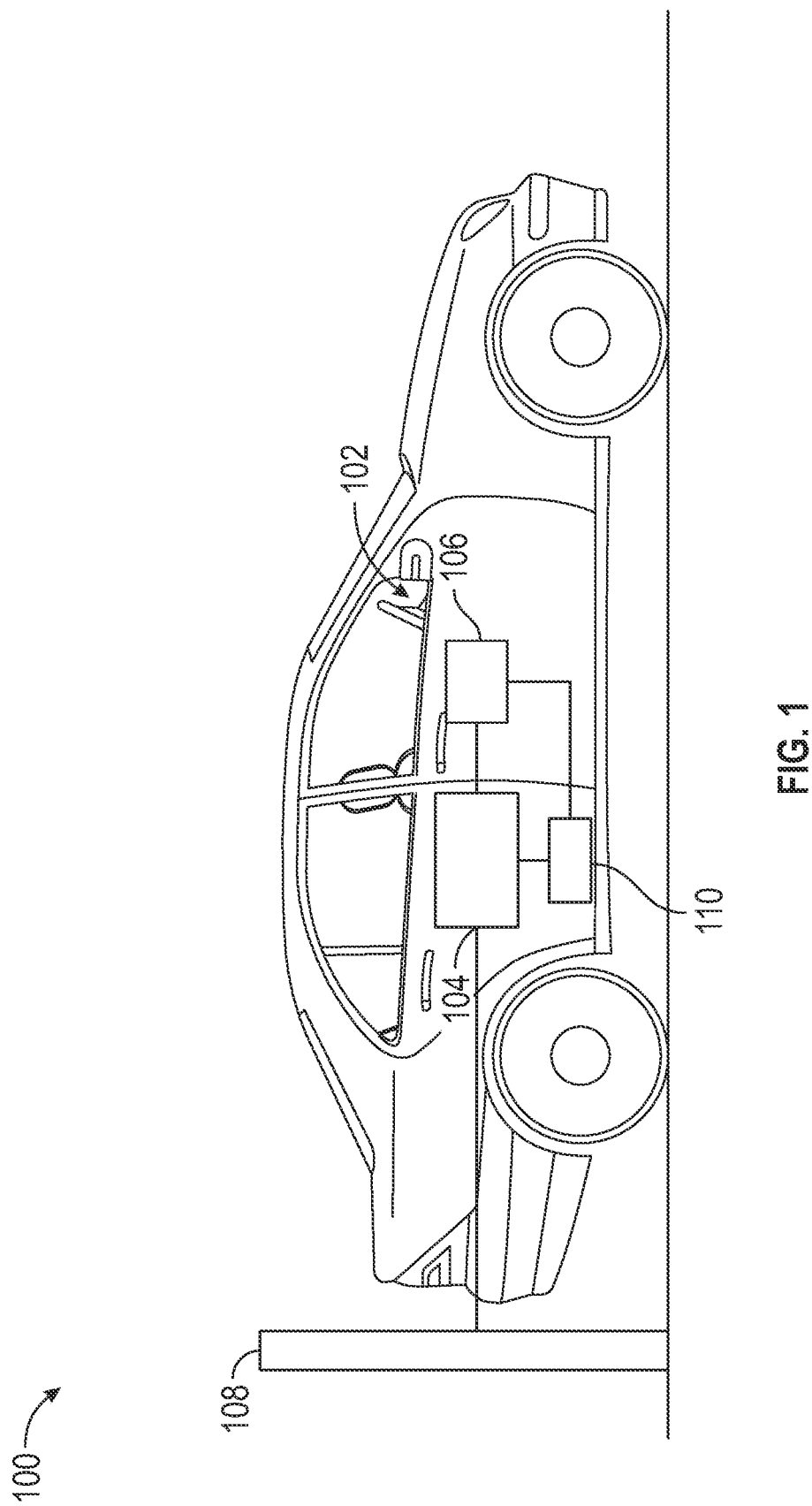
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 100. The electric vehicle 100 includes an electrical system 102 having a drive system 104 and an electric motor 106 which operates using power provided by the drive system. As shown in FIG. 1, the electric vehicle 100 is shown plugged into an external power grid 108 or other external electrical device or location. The external power grid 108 can be a home, a residence, an office, a charging station, etc. It is noted that the external power grid 108 can include more than a power source but can also include other electric components that are typically powered by the external power grid 108. For example, if the external power grid 108 is a home or residence, the electric components can include lights, televisions, computers, clocks, appliances such as washer/dryer, electric stove, refrigerator, etc. Power can flow between the external power grid 108 and the electric vehicle 100 in either direction (i.e., bi-directionally). Thus, the external power grid 108 can be used to charge the drive system 104. Alternatively, the drive system 104 can be used to charge the external power grid 108 or to provide power to one or more of the electrical components (e.g., washer/dryer) of the external power grid 108. It is to be understood that the electric vehicle 100 can have more than one electric motor and each electric motor can have an associated drive system.

The electric vehicle 100 further includes a controller 110. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 may include a non-transitory computer-readable medium that stores instructions which, when processed by one or more processors of the controller 110, implement a method of controlling an operation for the drive system 104.

Figure 2:
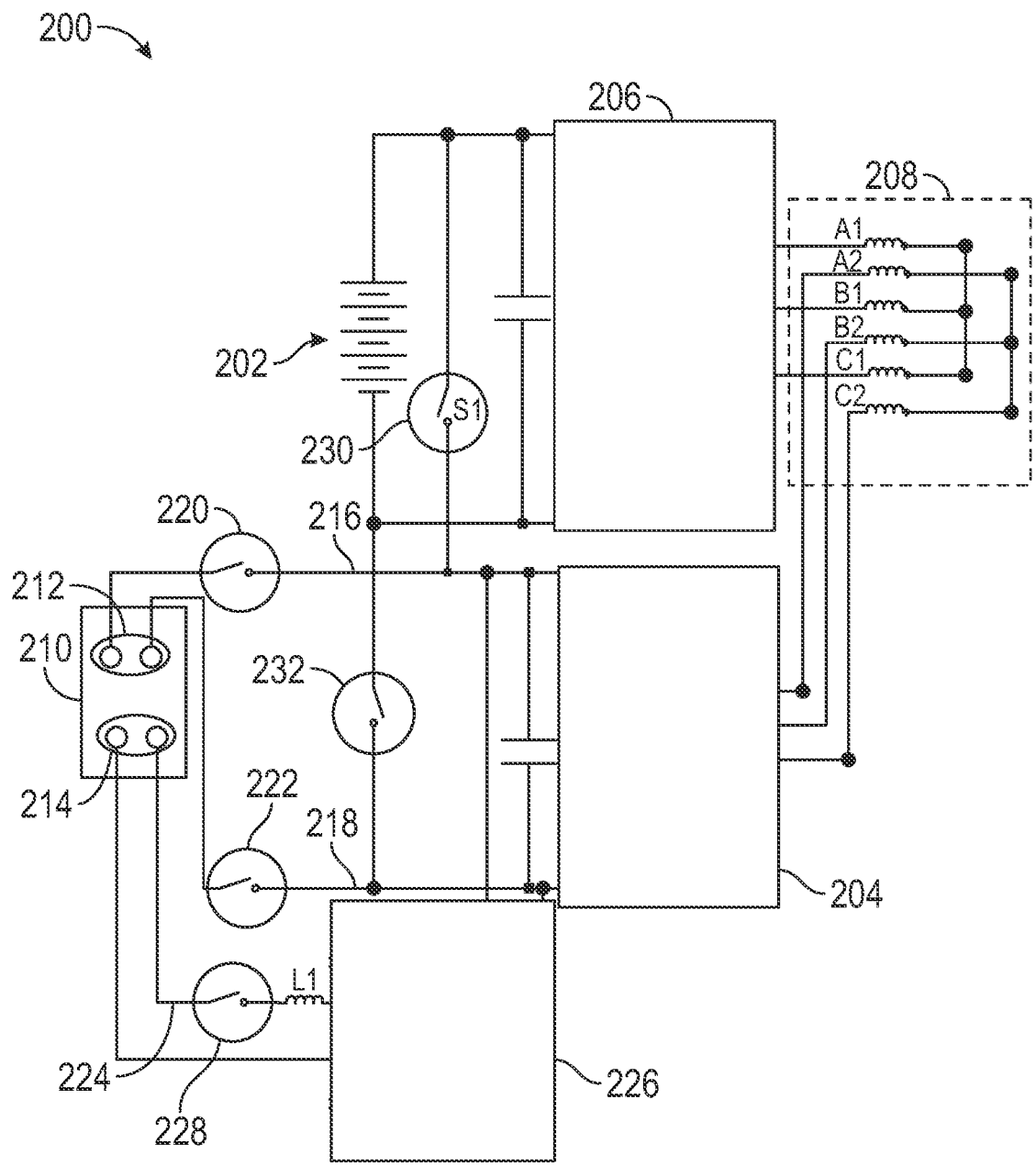
FIG. 2 shows a drive circuit of a drive system of the electric vehicle, in an embodiment.

FIG. 2 shows a drive circuit 200 of the drive system 104 of the electric vehicle 100, in an embodiment. The drive circuit 200 includes a power source or battery 202, a first inverter 204, a second inverter 206 and a winding machine 208. The first inverter 204 and the second inverter 206 are electrically separated from each other and can be powered using separate power modules and drivers. The first inverter 204 and the second inverter 206 each include a plurality of transistors or MOSFETs suitable for conversion between direct current (DC) and alternating current (AC). The winding machine 208 includes windings that are separated into two electrically isolated winding groups. Each winding group has its own neutral connection. Both winding groups share the same stator core and have the same rotor. The windings can be electromagnetically symmetric about the winding machine to avoid any unbalance, to increase ease of control, etc., but can be electromagnetically unsymmetric about the winding machine in other embodiments. The winding machine can be of any form (i.e., a wound-field synchronous machine, synchronous reluctance machine, interior permanent magnet electric machine, surface permanent magnet electric machine, induction electric machine, etc.)

The first inverter 204 can be used to convert between DC power at the external power grid 108 and AC power at the electric motor 106. The second inverter 206 can be used to convert between DC power at the battery 202 to AC power at the electric motor 106. The drive circuit 200 can be coupled to the external power grid 108 via a universal charger 210, which is an outlet of the external power grid that includes both a direct current port (DC port 212) and an alternating current port (AC port 214). The winding machine 208 is incorporated within the electric motor 106.

The drive circuit 200 includes a high voltage DC bus 216 for connecting to a high voltage socket of the DC port 212 and a low voltage DC bus 218 for connecting to a low voltage socket of the DC port 212. A first DC port switch 220 controls a connection between the DC port 212 and the high voltage DC bus 216. A second DC port switch 222 controls a connection between the DC port 212 and the low voltage DC bus 218. An AC bus 224 extends between the AC port 214 and a front-end rectifier 226. An AC port switch 228 on the AC bus 224 controls a connection between the AC port 214 and the front-end rectifier 226. An inductor (L1) can be disposed on the AC bus 224. The front-end rectifier 226 decouples AC/DC power transfer between the AC port 214 and the other components of the drive circuit 200, such as the first inverter 204.

In various embodiments, the first inverter 204 can be a two-level inverter or a multi-level inverter, the second inverter 206 can be a two-level inverter or a multi-level inverter, and the front-end rectifier 226 can be a two-level inverter or a multi-level inverter. The front-end rectifier 226 can also be a one-level rectifier, multi-level rectifier, or a Vienna rectifier, which are types of two-level inverters or multi-level inverters. Examples of two-level inverter or a multi-level inverter are shown in FIGS. 16-22.

A battery contact switch 230 is located between the battery 202 and the high voltage DC bus 216. The battery contact switch 230 can be turned on (closed) during a drive mode (to operate the electric vehicle 100) and can be either off or on (open or closed) during a charging mode. A switch 232 between the low voltage DC bus 218 and the battery 202 can be opened to decouple the battery and the low voltage DC bus during operation of the front-end rectifier 226 during AC charging. As shown in FIG. 2, the front-end rectifier 226 is a single-phase rectifier. However, this is not meant to be a limitation of the invention.

Figure 3:
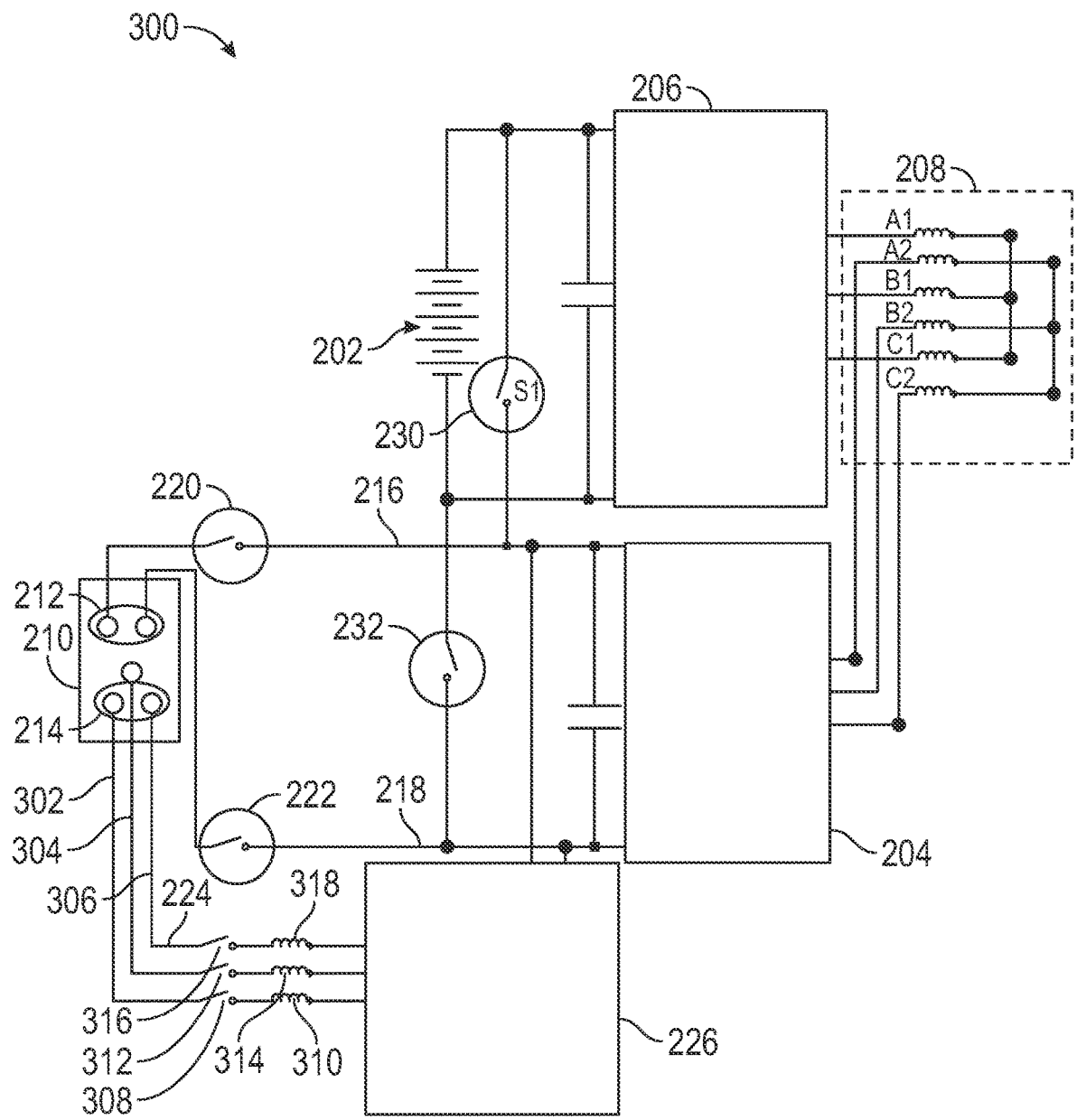
FIG. 3 shows an alternative drive circuit in which an AC port connects to a front-end rectifier via a three-phase interface.

FIGS. 3-6 shows the drive circuit 200 in various alternative embodiments. Each of the first inverter 204, the second inverter 206 and the front-end rectifier 226 of FIGS. 3-6 can be a two-level inverter or a multi-level inverter, examples of which are shown in FIGS. 16-22. FIG. 3 shows an alternative drive circuit 300 in which the AC port 214 connects to the front-end rectifier 226 via a three-phase interface including a first bus 302, second bus 304 and third bus 306. The first bus 302 includes a first switch 308 and a first inductor 310. The second bus 304 includes a second switch 312 and a second inductor 314. The third bus 306 includes a third switch 316 and a third inductor 318.

Figure 4:
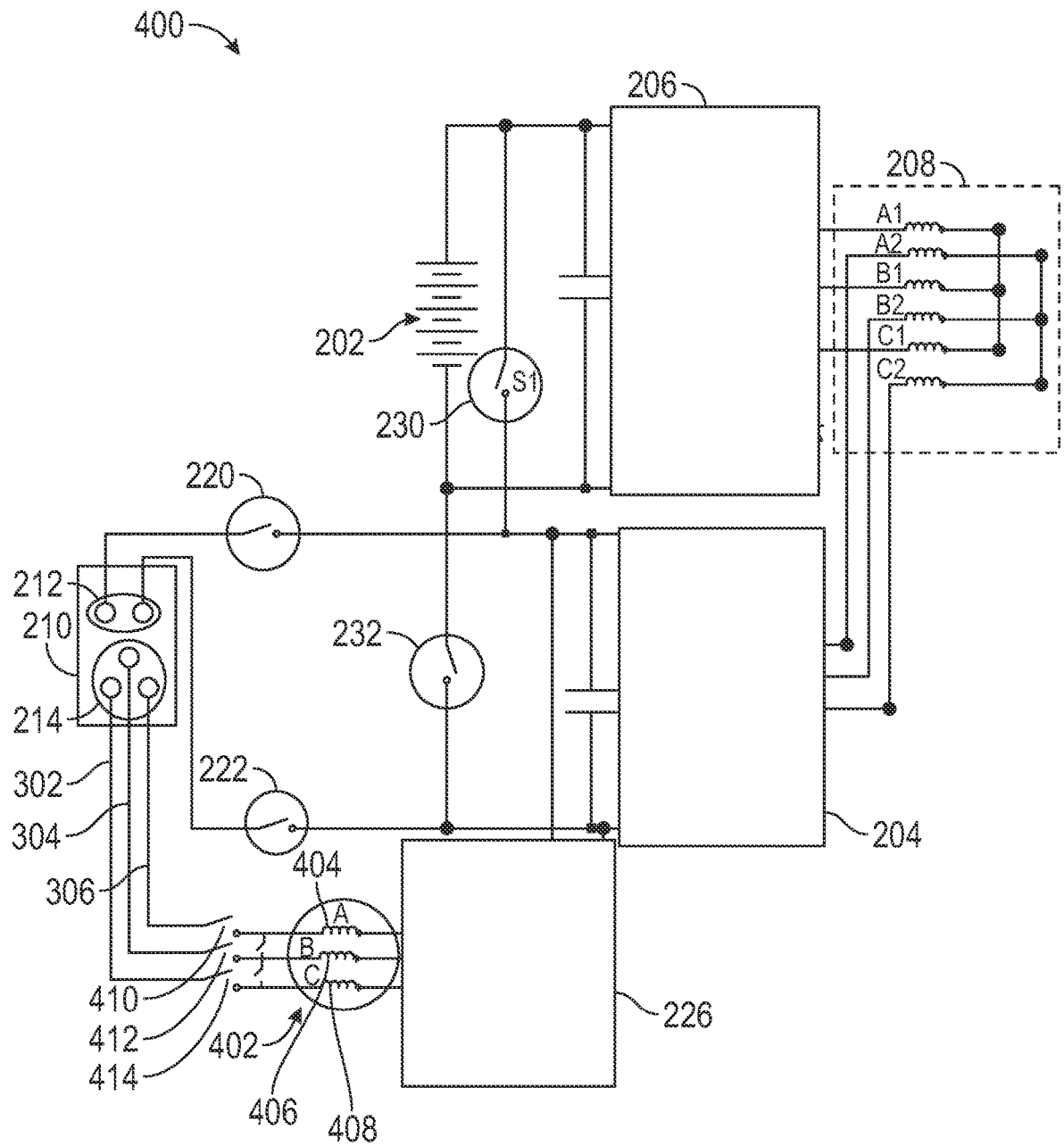
FIG. 4 shows an alternative drive circuit including an electric machine between the front-end rectifier and the AC port, in a three-phase configuration.
Figure 5:
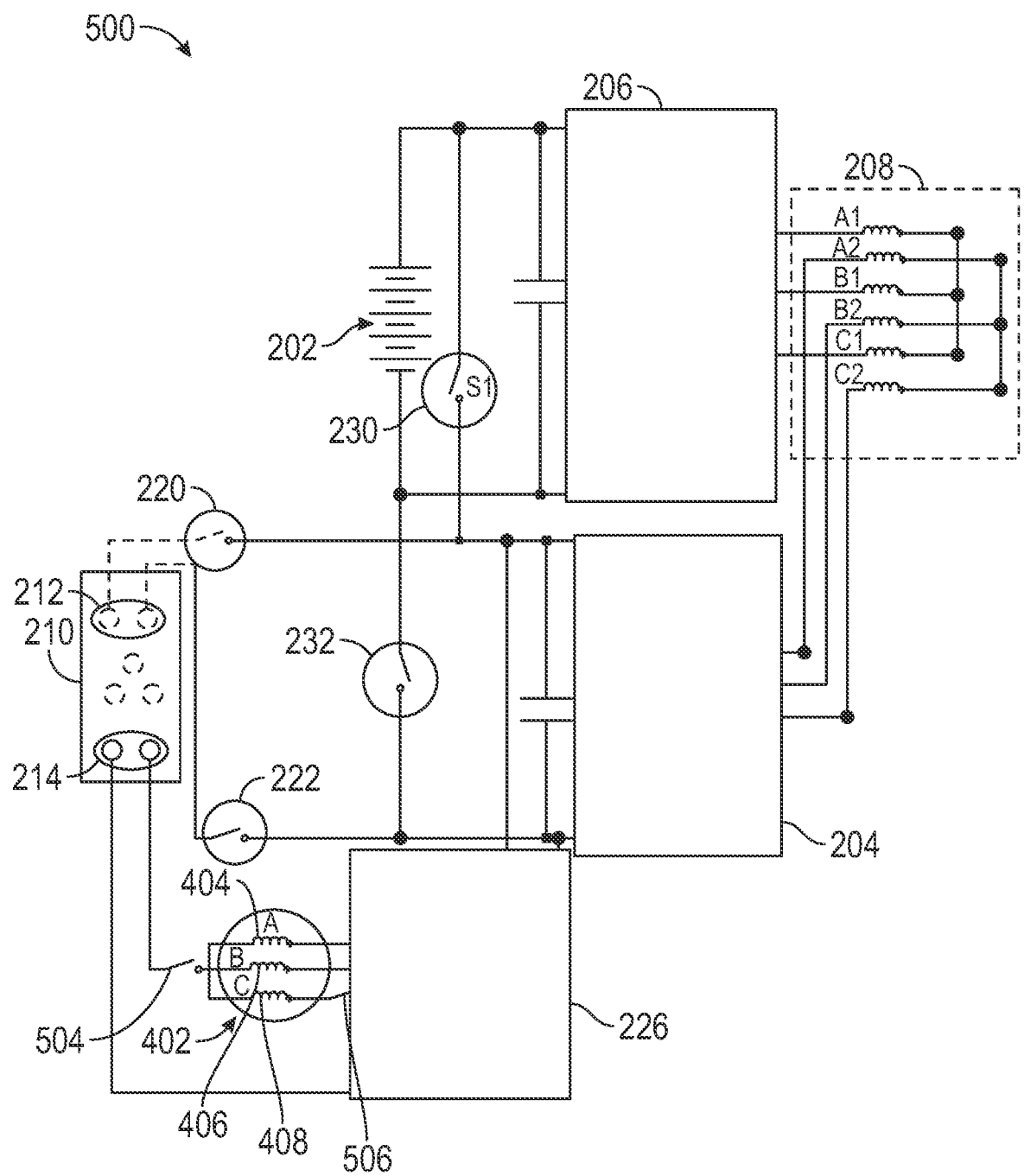
FIG. 5 show an alternative drive circuit in which the electric machine between the front-end rectifier and the AC port is in a first single-phase configuration.
Figure 6:
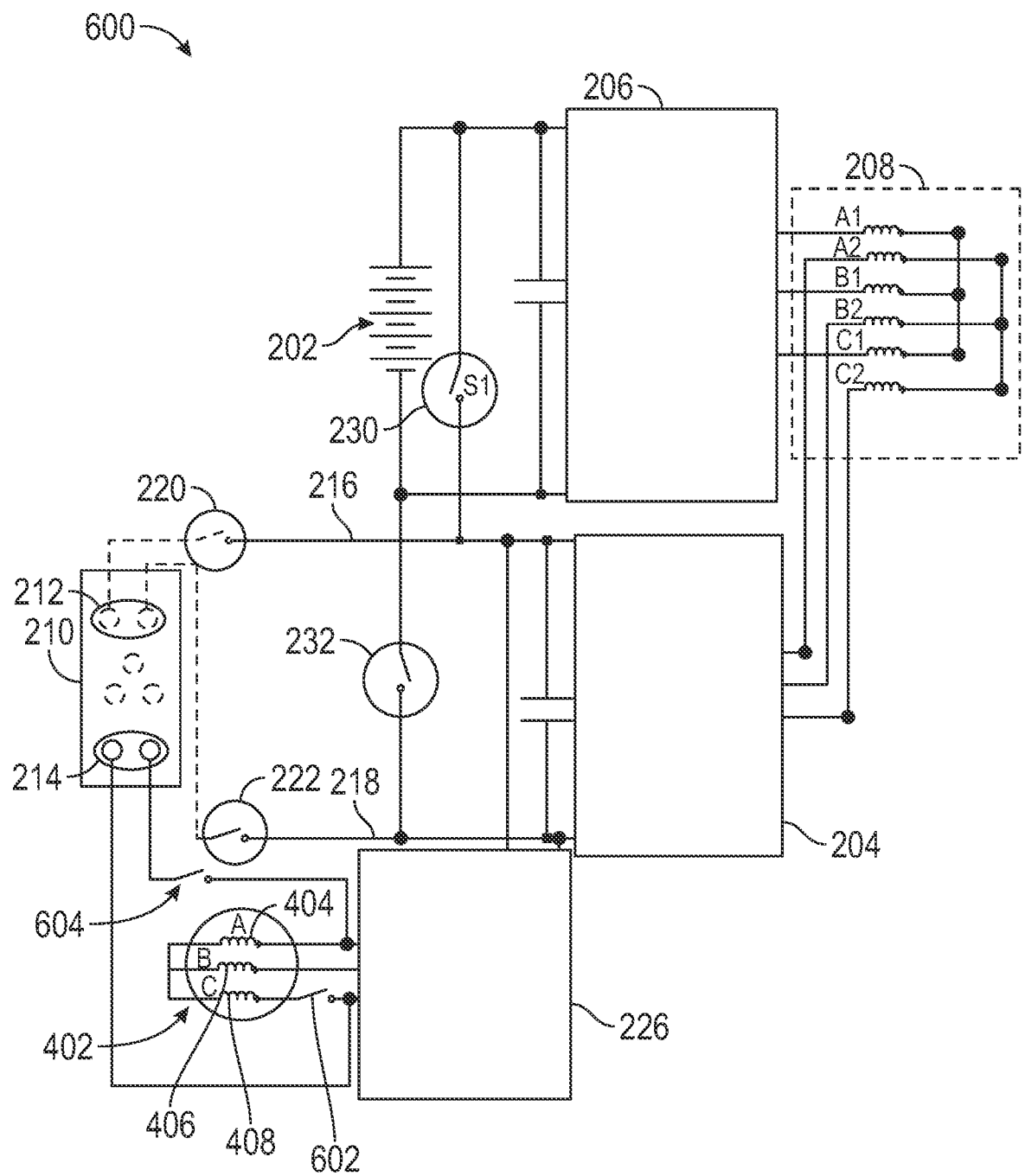
FIG. 6 shows an alternative drive circuit in which the electric machine between the front-end rectifier and the AC port is in a second single-phase configuration.

In various embodiments, the first inverter 204, second inverter 206 and winding machine 208 operate as an electrical system for a first motor drive (first drive system) of the electric vehicle 100. In FIGS. 4-6, a second motor drive (second drive system) of the electric vehicle 100 can be used to achieve a similar function as the front-end rectifier 226 plus the inductors 310, 314, 318 in FIG. 3. Three phase machine windings of the second motor drive can be used as the inductors 310, 314 and 318 and an inverter of the second motor drive can be used as the front-end rectifier 226.

FIG. 4 shows an alternative drive circuit 400 including an electric machine 402 between the front-end rectifier 226 and the AC port 214, in a three-phase configuration. The electric machine 402 includes three winding branches 404, 406 408. Switches 410, 412 and 414 connect each of the three winding branches 404, 406, 408, respectively, of the electric machine 402 to outlets of the AC port 214. When the switches 410, 412, 414 are closed, the electric machine 402 can be operated off of the AC power transferred between the AC port 214 and the front-end rectifier 226. Disconnect switches between the three winding branches 404, 406, 408 can be opened to disconnect a neutral connection between the three winding branches 404, 406, 408 during a power transfer operation and can be closed when the electric vehicle is operating in a propulsion mode, FIG. 5 show an alternative drive circuit 500 in which the electric machine 402 between the front-end rectifier 226 and the AC port 214 is in a first single-phase configuration. A first switch 504 is located between the AC port 214 and the upstream ends of the three winding branches 404, 406, 408 of the electric machine 402. A second switch 506 connects a downstream end of the electric machine 402 back to the AC port 214. When the first switch 504 and second switch 506 are closed, the electric machine 402 can be operated with all three winding branches 404, 406, 408 tapped to one phase.

FIG. 6 shows an alternative drive circuit 600 in which the electric machine 402 between the front-end rectifier 226 and the AC port 214 is in a second single-phase configuration. A first switch 604 is connected between the AC port 214 and a first winding branch 404 and a second switch 606 is connected between the AC port 214 and a third winding branch 408. The first switch 604 and the second switch 606 are closed to operate the electric machine 402 connected to a neutral point.

Figure 7:
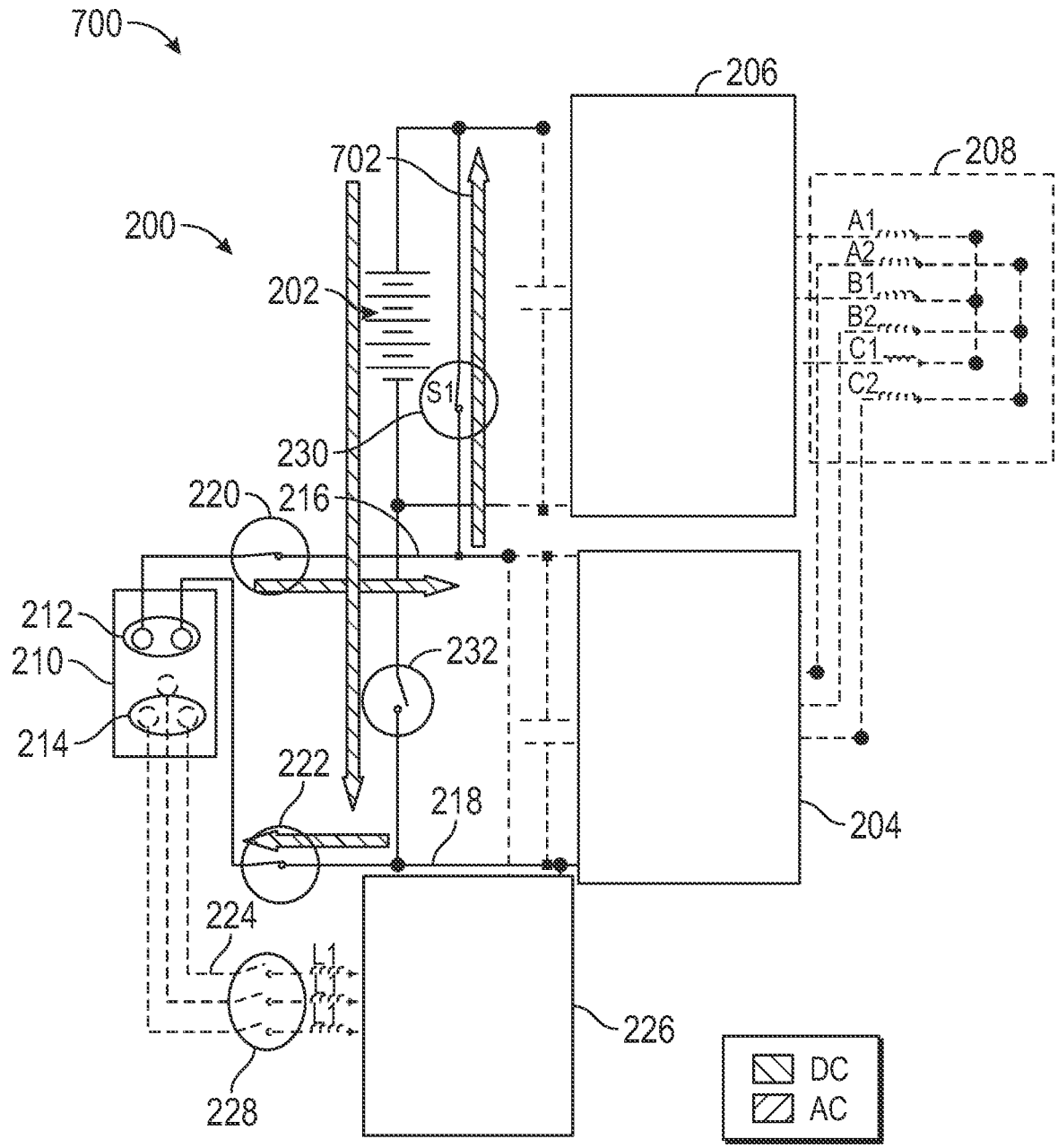
FIG. 7 shows a first DC configuration of the drive circuit for transferring power between the battery and the universal charger via the DC port.

FIG. 7 shows a first DC configuration 700 of the drive circuit 200 for transferring power between the battery 202 and the universal charger 210 via the DC port 212. The controller 110 or a processor can control the configuration of the switches to select the first DC configuration 700. The controller 110 can select the DC configuration when DC power transfer is desired and when the voltage of the battery 202 is the same as the voltage at the DC port 212. In the first DC configuration 700, the first DC port switch 220, second DC port switch 222 and battery contact switch 230 are closed, while the AC port switch 228 is open, thereby disabling the front-end rectifier 226, the first inverter 204, second inverter 206. As a result, from a front function point of view, the first inverter 204, and the second inverter 206, winding machine 208 and front-end rectifier 226 are removed from the drive circuit. The battery 202 is thus connected directly to the DC port 212. Power can flow between the battery 202 and the universal charger 210 in either direction via the current flow path 702 shown in FIG. 7. Each of the first inverter 204, the second inverter 206 in FIG. 7 and the front-end rectifier 226 can be a two-level inverter or a multi-level inverter, examples of which are shown in FIGS. 16-22.

Figure 8:
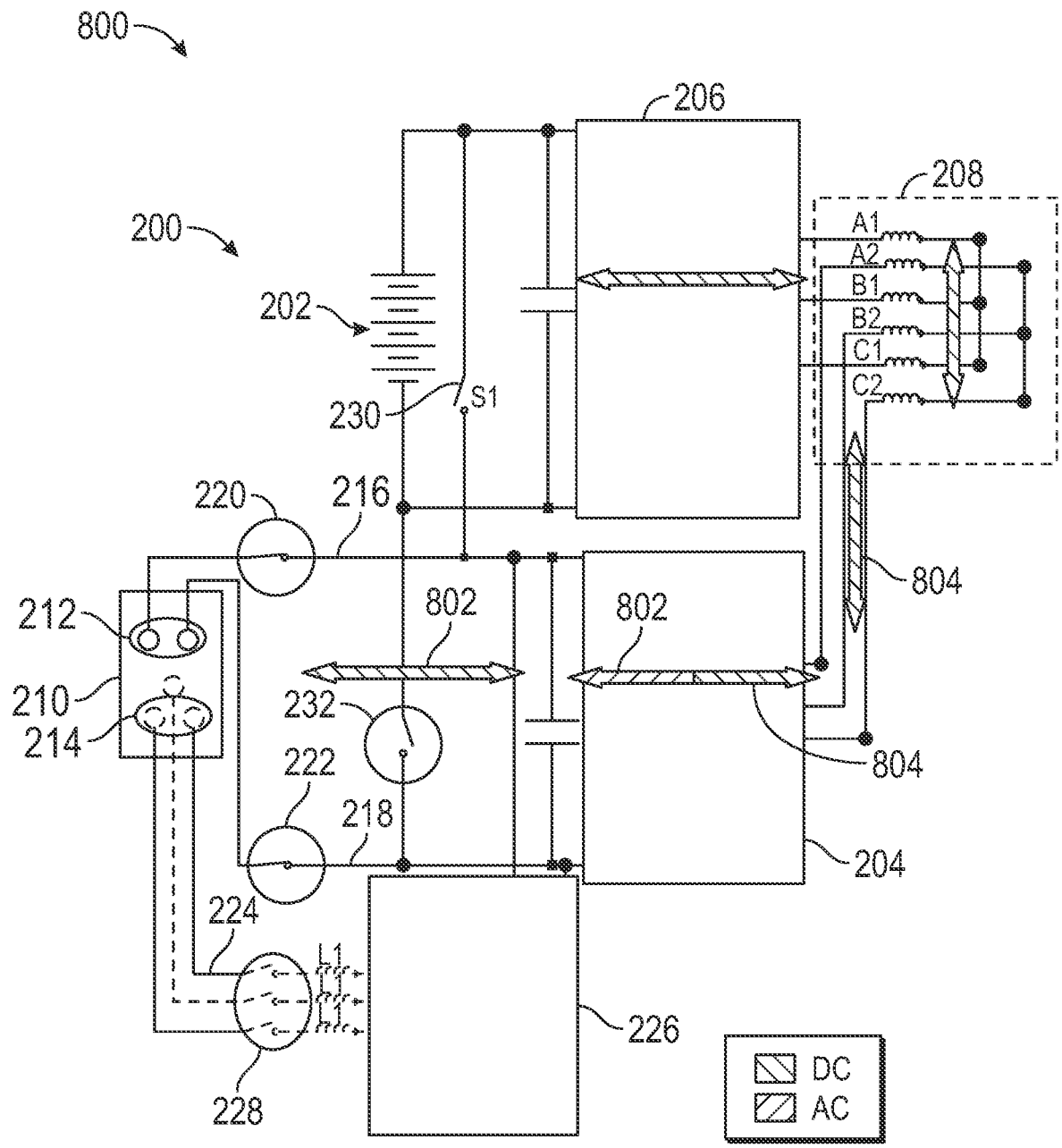
FIG. 8 shows a second DC configuration of the drive circuit for transferring power between the battery and the universal charger via the DC port.

FIG. 8 shows a second DC configuration 800 of the drive circuit 200 for transferring power between the battery 202 and the universal charger 210 via the DC port 212. The controller 110 or processor selects the second DC configuration 800 when DC power transfer is desired and when the voltage of the battery 202 is different from the voltage of the DC port 212. In the second DC configuration 800, the first DC port switch 220 and second DC port switch 222 are closed, while the battery contact switch 230 and the AC port switch 228 are open. As a result, from a function point of view, the first inverter 204, second inverter 206 and winding machine 208 are included in the drive circuit 200, while the front-end rectifier 226 is not included in the drive circuit. Each of the first inverter 204, the second inverter 206 and the front-end rectifier 226 in FIG. 8 can be a two-level inverter or a multi-level inverter, examples of which are shown in FIGS. 16-22.

The current can flow through the circuit in either direction as indicated by grid-side DC current 802 and AC current 804 in FIG. 8. The first inverter 204 and second inverter 206 are used as dual active bridge DC-DC converters, LLC converters, or CLLC converter. The grid-side DC current 802 is converted to AC current 804 at the first inverter 204. The AC current 804 flows between the first inverter 204 and grid-side winding of the winding machine 208, which includes a first set of coils. On the grid-side of the winding machine 208, AC current 804 flows between the second inverter 206 and a battery-side winding of the winding machine 208, which includes a second set of coils. The second inverter 206 converts DC current from the battery to the AC current that flows to the winding machine 208. The first set of coils and the second set of coils enable the winding machine 208 to act as a transformer that galvanically isolates the AC current 804 from the grid-side DC current 802. Power can flow through the winding machine 208 in either direction between the battery 202 and the DC port 212.

Figure 9:
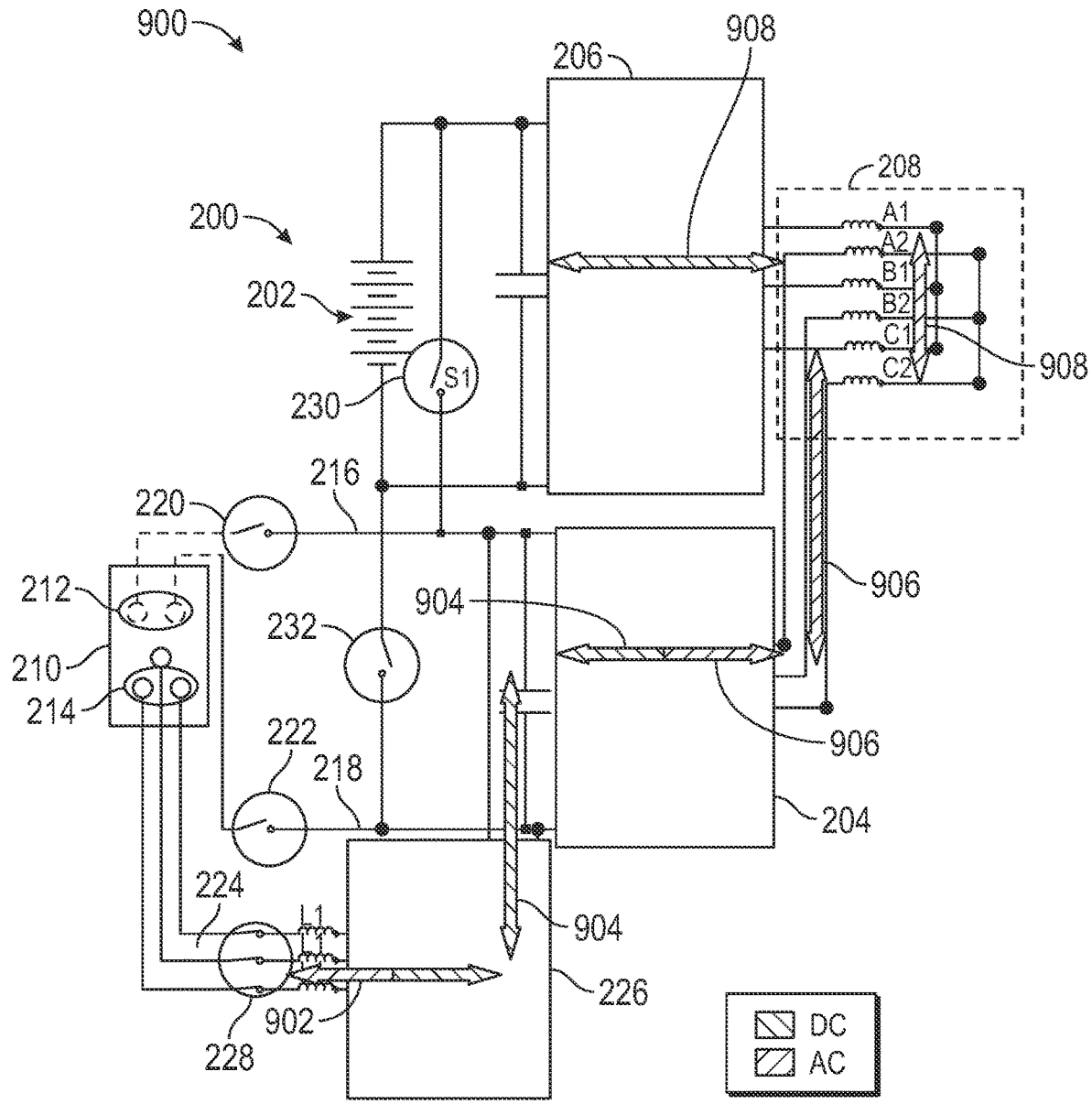
FIG. 9 shows an AC configuration of the drive circuit for transferring power between the battery and the external power grid via the AC port.

FIG. 9 shows an AC configuration 900 of the drive circuit 200 for transferring power between the battery 202 and the external power grid 108 via the AC port 214. In the AC configuration 900, the battery contact switch 230 is open, the first DC port switch 220 and the second DC port switch 222 are open. The AC port switch 228 is closed, thereby connecting the front-end rectifier 226 to the AC port 214.

In one embodiment, AC power is transferred from the external power grid 108 to the electric vehicle 100. AC current 902 flows from the AC port 214 to the front-end rectifier 226. The front-end rectifier 226 converts the AC current 902 to DC current 904, which flows to the first inverter 204. The first inverter 204 converts the DC current 904 to a grid-side AC current 906, which flows to the winding machine 208. At the winding machine 208, the grid-side AC current 906 flows through the grid-side windings (i.e., the first set of coils) to induce a battery-side AC current 908 in the battery-side winding (i.e., the second set of coils). The battery-side AC current 908 flows to the second inverter 206, which converts the battery-side AC current to a DC current 910 which is used to charge the battery 202.

In another embodiment, AC power is transferred from the electric vehicle 100 to the external power grid 108. DC current 910 flows from the battery 202 to the second inverter 206. The second inverter 206 converts the DC current 910 to a battery-side AC current 908 that is sent to the winding machine 208. At the winding machine 208, the battery-side AC current 908 flows through the battery-side winding (i.e., the second set of coils) to induce a grid-side AC current 906 in the grid-side winging (i.e., the first set of coils). The grid-side AC current 906 is sent to the first inverter 204 which converts the grid-side AC current to a DC current 904. The DC current 904 is sent from the first inverter 204 to the front-end rectifier 226. The front-end rectifier 226 converts the DC current 904 to AC current 902, which flows to the AC port 214. Each of the first inverter 204, the second inverter 206 and the front-end rectifier 226 in FIG. 9 can be a two-level inverter or a multi-level inverter, examples of which are shown in FIGS. 16-22.

Figure 10:
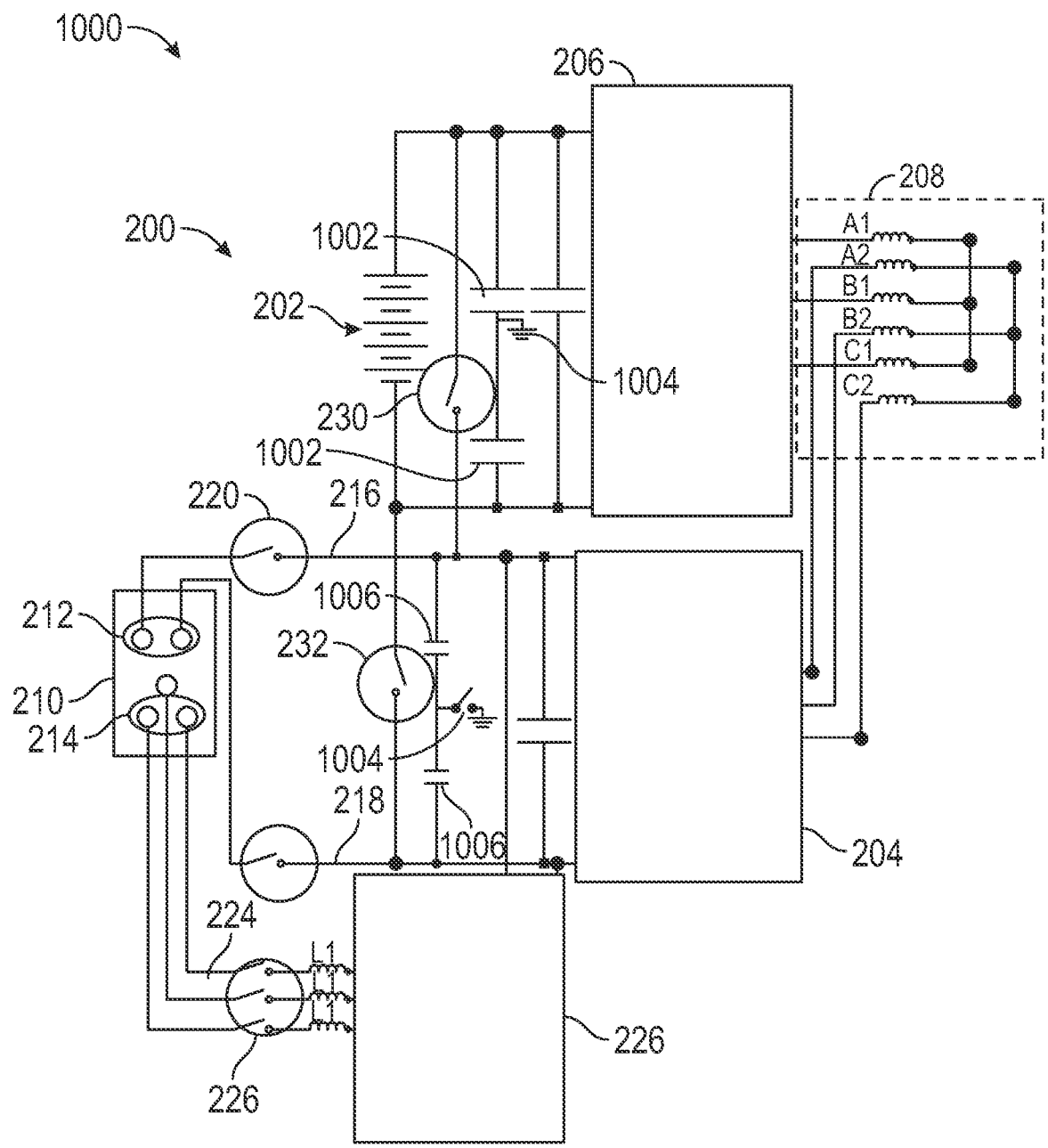
FIG. 10 shows a diagram depicting the drive circuit in an alternative embodiment.

FIG. 10 shows a diagram 1000 depicting the drive circuit 200 in an alternative embodiment. A first set 1002 of Y-capacitors extends across the poles of the battery 202 to isolate the second inverter 206 from ground 1004. Also, a second set 1006 of Y-capacitors are located between the high voltage DC bus 216 and the low voltage DC bus 218 to isolate the first inverter 204 from ground 1004. The first set 1002 and the second set 1006 further provide electric isolation across the winding machine 208. Each of the first inverter 204, the second inverter 206 and the front-end rectifier 226 in FIG. 10 can be a two-level inverter or a multi-level inverter, examples of which are shown in FIGS. 16-22.

Figure 11:
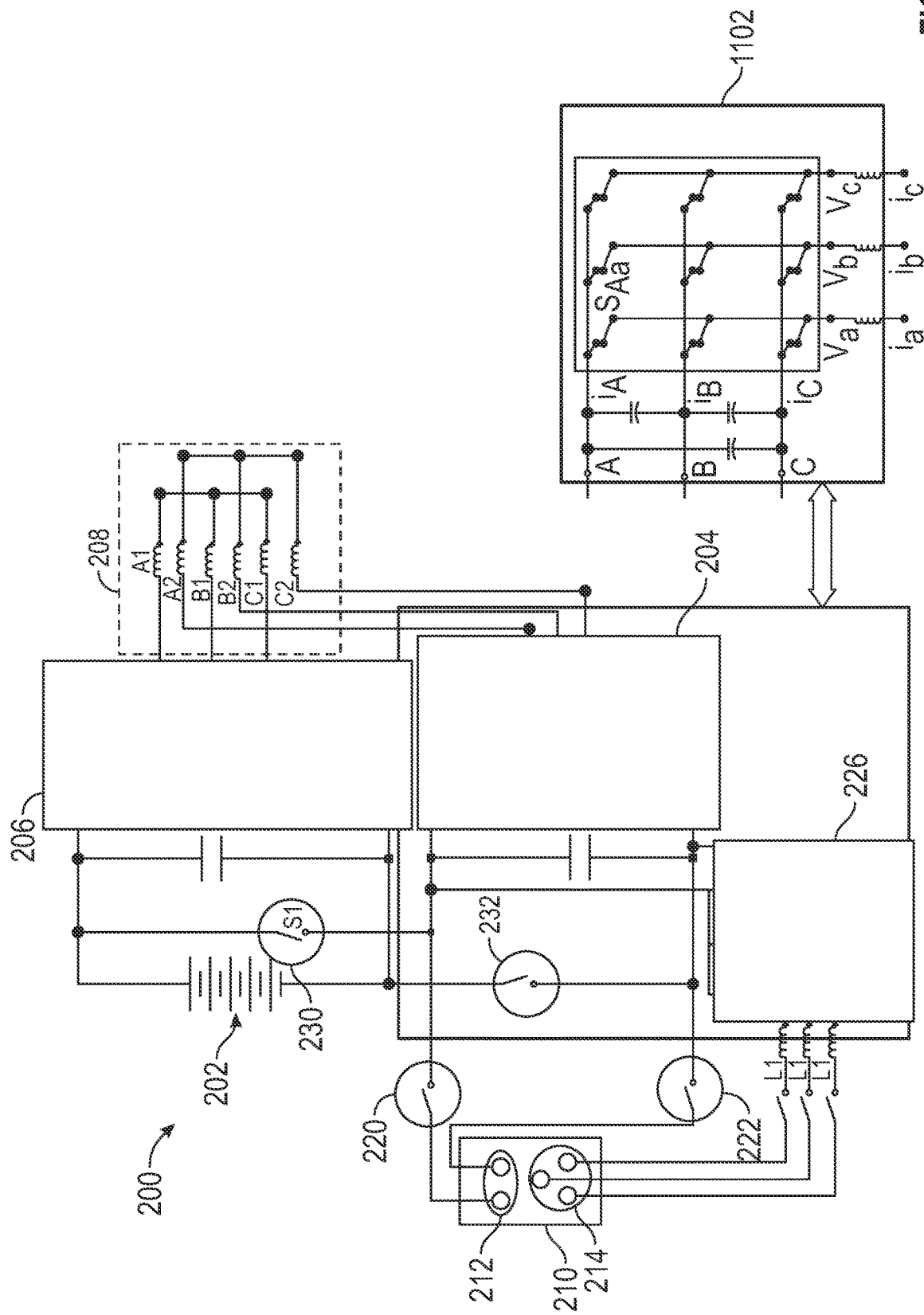
FIG. 11 shows the drive circuit in another alternative embodiment.

FIG. 11 shows a matrix converter that can be used within the drive circuit 200 in an embodiment. The matrix converter 1102 converts an AC current to an AC current and can be inserted into the drive circuit 200 to replace the front-end rectifier 226 and the first inverter 204. For a three-phase winding, the matrix converter 1102 can operate using 9 switches, instead of the 12 or more switches it replaces (i.e., the 6 or more transistors of the front-end rectifier 266 and the 6 or more transistors of the first inverter 204). When the matrix converter 1102 is used, input inductors L1 are not necessary. The front-end rectifier 226 of FIG. 4 can be a two-level inverter or a multi-level inverter, examples of which are shown in FIGS. 16-22.

Figure 12:
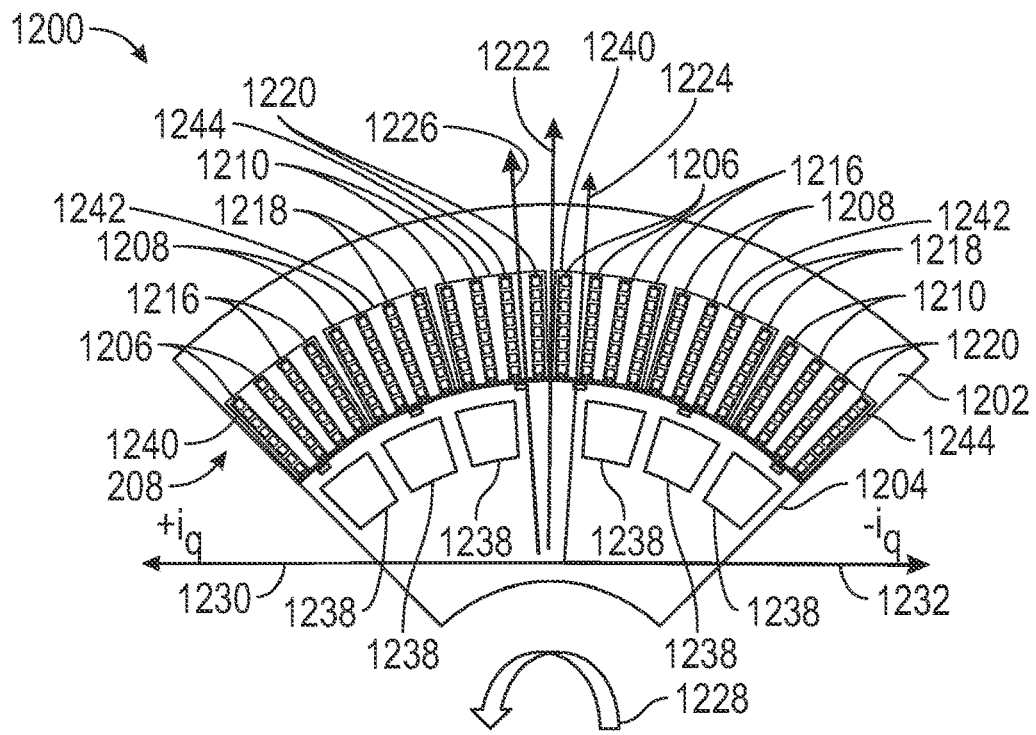
FIG. 12 shows a diagram depicting the winding machine along a longitudinal axis, in an embodiment.

FIG. 12 shows a diagram 1200 depicting the winding machine 208 along a longitudinal axis, in an embodiment. In an embodiment, the winding machine 208 is a three-phase permanent magnet motor and includes a stator 1202 and a rotor 1204. The rotor 1204 includes one or more permanent magnets 1238 forming a D-axis 1222 (direct axis). The stator 1202 includes grid-side windings including a first set of coils and battery side windings including a second set of coils. The first of coils and the second set of coils are interleaved between each other. Since the winding machine 208 is a three-phase permanent magnet motor, the grid-side windings include a first grid-side coil 1206, second grid-side coil 1208, and third grid-side coil 1210 and the battery-side winding includes a first battery-side coil 1216, a second battery-side coil 1218 and a third battery-side coil 1220.

The first grid-side coil 1206 and the first battery-side coil 1216 form a first galvanic pair 1240. The second grid-side coil 1208 and the second battery-side coil 1218 form a second galvanic pair 1244. The third grid-side coil 1210 and the third battery-side coil 1220 winding W2 form a third galvanic pair 1246. An A-axis is an axis of flux for a coil. A first A-axis 1224 is shown for the grid side windings and a second A-axis 1226 is shown for the battery-side windings. A rotation direction 1228 for the rotor 1204 is shown. The grid-side winding consumes power from the grid using $+i_q$ 1230. The battery-side winding W2 delivers power to the battery using $-i_q$ 1232.

Figure 13:
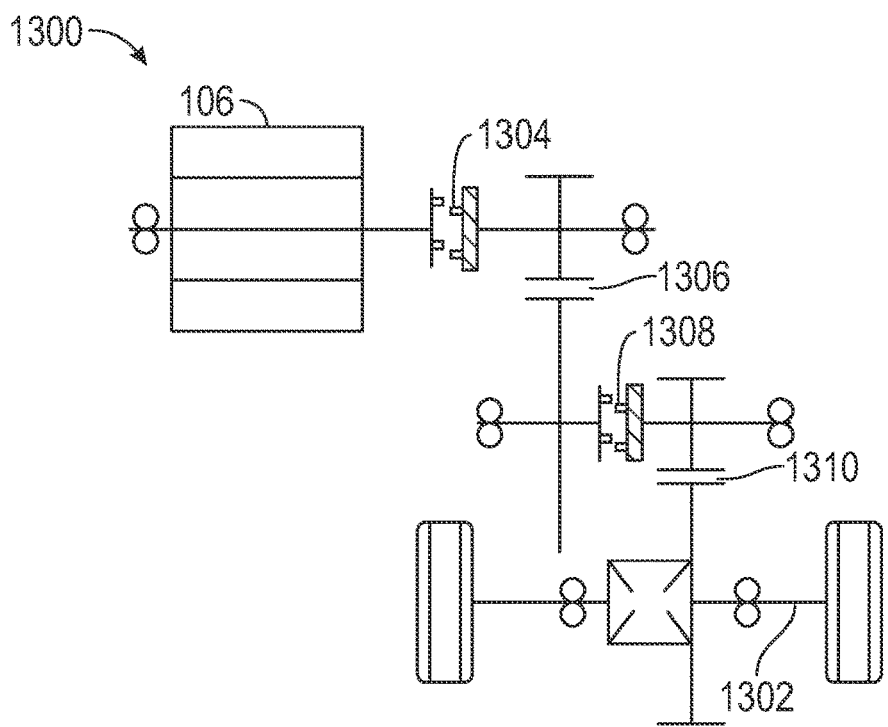
FIG. 13 shows a schematic diagram of a transmission system of the electric vehicle.

FIG. 13 shows a schematic diagram 1300 of a transmission system of the electric vehicle 100. When power is being transferred into or out of the electric vehicle 100, the electric motor 106 (i.e., the winding machine 208) is to be disconnected from the rest of the vehicle so that a rotation of the electric motor during power transfer does not cause the vehicle to move. The electric motor 106 is shown to be connected to an axle 1302 of the electric vehicle 100 via a first clutch 1304, a first gearset 1306, a second clutch 1308, and a second gearset 1310. The first clutch 1304 can be disengaged to separate the winding machine 208 from the rest of the electric vehicle 100.

Figure 14:
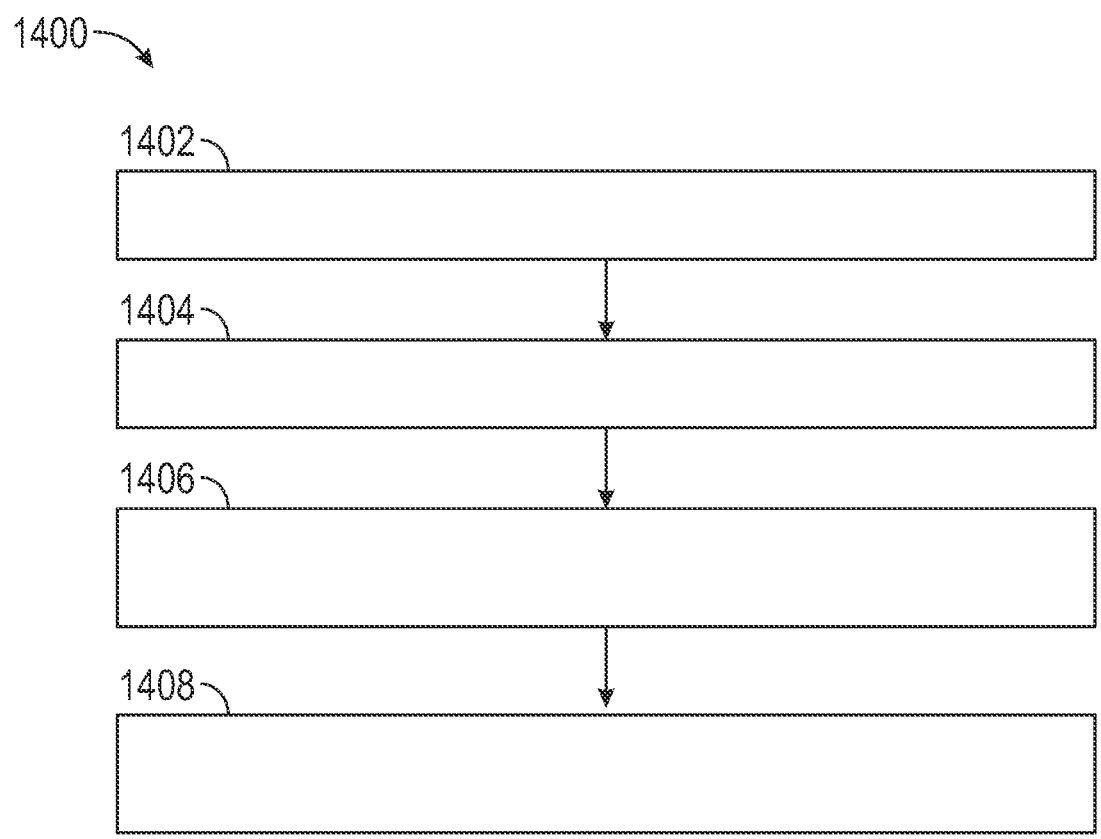
FIG. 14 is a flowchart of a method of preparing the vehicle for use of the electric motor for the purposes of power transfer.

FIG. 14 is a flowchart 1400 of a method of preparing the vehicle for use of the electric motor 106 for the purposes of power transfer. In box 1402, the vehicle is engaged in park. In box 1404, the electric motor 106 is disconnected from the rest of the vehicle, such as by disengaging the first clutch 1304. In box 1406, a power level, speed and operating frequency for the power transfer is selected. In box 1408, the winding machine is used to for power transfer.

Figure 15:
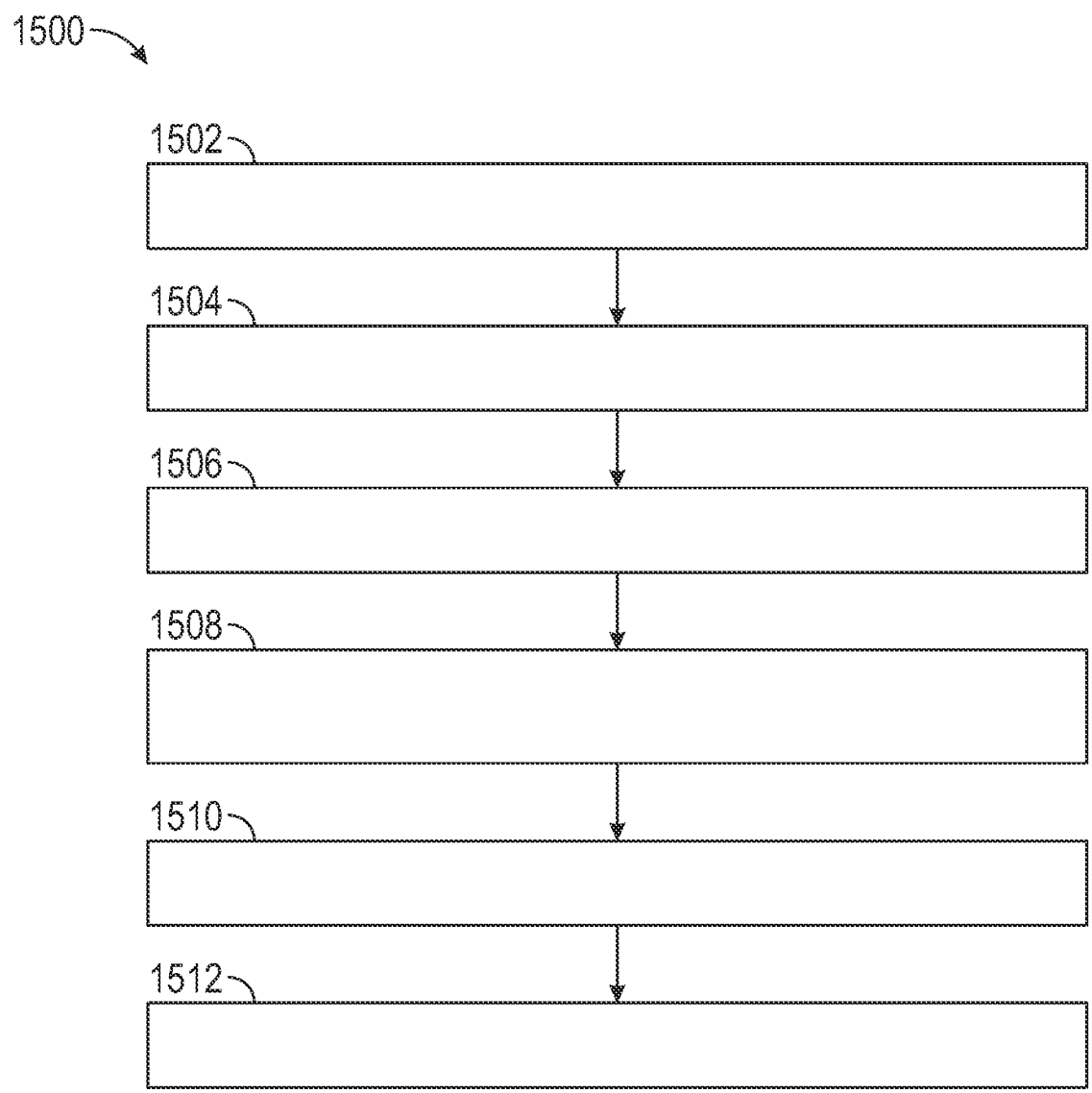
FIG. 15 is a flowchart of a method for reconnecting the electric motor to the vehicle for drive purposes.

FIG. 15 is a flowchart 1500 of a method for reconnecting the electric motor 106 to the vehicle for drive purposes. In box 1502, power transfer between the vehicle and the external power grid is stopped. In box 1504, the electric motor is switched to a motoring mode using either the first inverter (powered externally) or the second inverter (powered by the battery). In box 1506, the speed of the electric motor 106 is brought down or reduced to recover kinematic energy of the electric motor. In box 1508, the clutch is engaged when the speed of the electric motor drops to less than a selected speed threshold. In box 1510, the battery contact switch 230 is opened to discharge the high voltage DC bus. In box 1512, the vehicle returns to a safe mechanical and electrical state.

Figure 16:
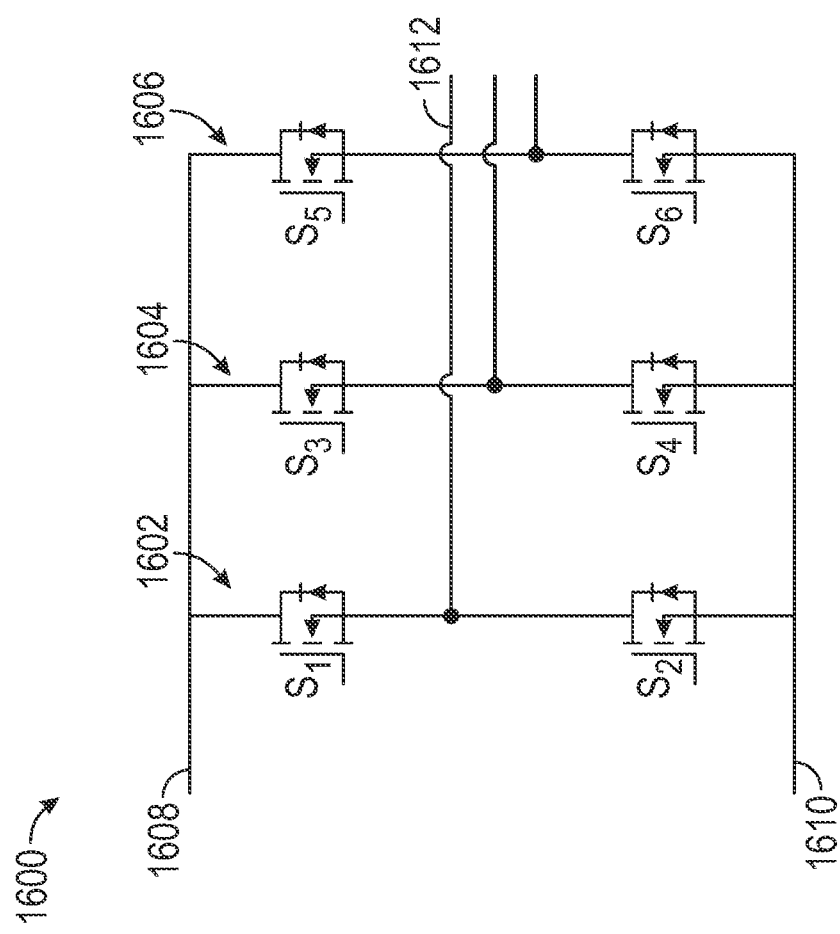
FIG. 16 shows a two-level inverter in an exemplary embodiment.

FIG. 16 shows a two-level inverter 1600 in an exemplary embodiment. The two-level inverter 1600 includes at least one branch (e.g., first branch 1602, second branch 1604, third branch 1606) that extends from a positive bus 1608 to a negative bus 1610. Each branch includes two switches in series between the positive bus 1608 and the negative bus 1610. For example, first branch 1602 includes switch S1 and switch S2. A phase winding connects to a branch between the two switches of the branch. For example, phase winding 1612 connects to the first branch 1602 between switch S1 and switch S2.

Figure 17:
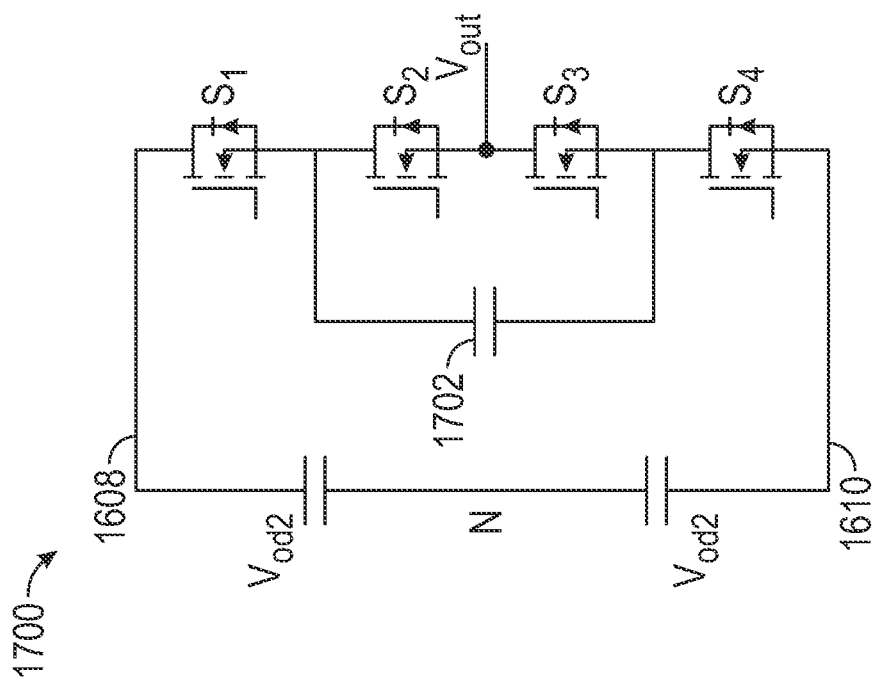
FIG. 17 shows a branch of a flying capacitor-type multi-level inverter.

FIG. 17 shows a branch 1700 of a flying capacitor-type multi-level inverter. The branch 1700 includes four switches (labelled S1, S2, S3 and S4) that are connected sequentially in series between the positive bus 1608 and the negative bus 1610. A node between switch S1 and switch S2 is connected to a node between switch S3 and switch S4 by a flying capacitor 1702.

Figures 18, 19:
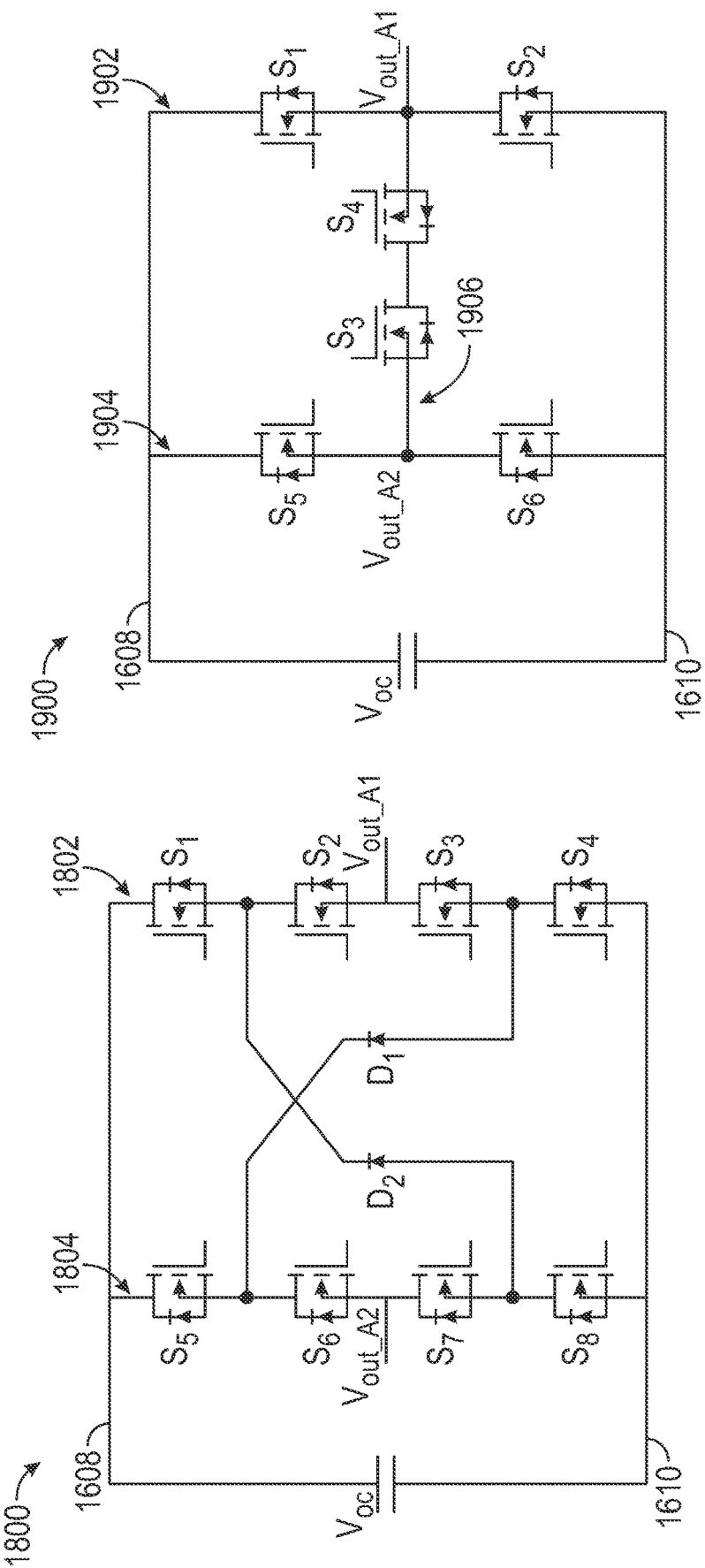
FIG. 18 shows a branch of an X-type multi-level inverter, in an embodiment.
FIG. 19 shows a branch of an H-type dual multi-level inverter, in an embodiment.

FIG. 18 shows a branch 1800 of an X-type multi-level inverter, in an embodiment. The branch 1800 includes a first sub-branch 1802 that includes switches S1, S2, S3 and S4 connected sequentially in series between the positive bus 1608 and the negative bus 1610 and a second sub-branch 1804 that includes switches S5, S6, S7 and S8 connected sequentially in series between the positive bus and the negative bus. A first diode D1 connects between a node between switch S3 and switch S4 and a node between switch S5 and switch S6. A second diode D2 connects between a node between switch S7 and switch S8 and a node between switch S1 and switch S2.

FIG. 19 shows a branch 1900 of an H-type dual multi-level inverter, in an embodiment. The branch 1900 includes a first sub-branch 1902 that includes switches S1 and S2 connected in series between the positive bus 1608 and the negative bus 1610 and a second sub-branch 1904 that includes switches S5 and S6 connected in series between the positive bus and the negative bus. A third sub-branch 1906 connects from a node between the switch S1 and switch S2 and a node between switch S5 and switch S6. In an embodiment, the third sub-branch can include additional switches S3 and S4, or a bidirectional switch, however this is not meant as a limitation.

Figure 20B:
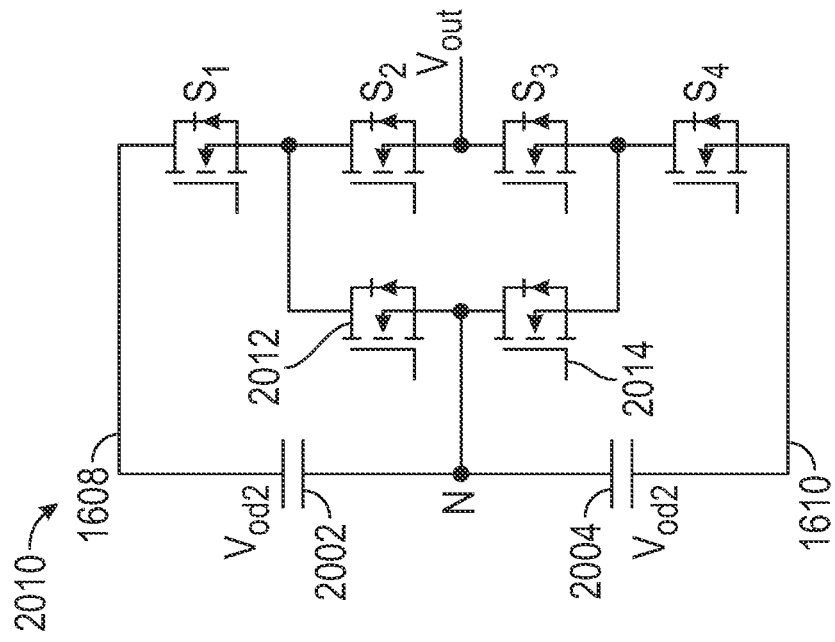
FIG. 20B shows a branch of an active clamped multi-level inverter, in an embodiment.
Figure 20A:
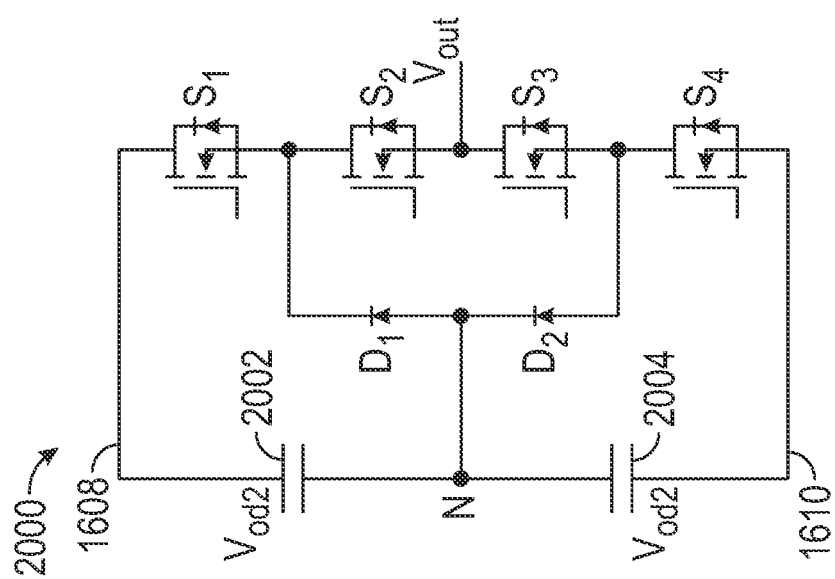
FIG. 20A shows a branch of a diode-clamped multi-level inverter, in an embodiment.

FIG. 20A shows a branch 2000 of a diode-clamped multi-level inverter, in an embodiment. The branch 2000 includes four switches (labelled S1, S2, S3 and S4) that are connected sequentially in series between the positive bus 1608 and the negative bus 1610. A first diode D1 connects a neutral node N to a node between switch S1 and switch S2. Similarly, a second diode D2 connects the neutral node N to a node between the switch S3 and switch S4. The neutral node N is located outside of the inverter and is isolated from the positive bus 1608 by a first capacitor 2002 and from the negative bus by a second capacitor 2004. In another embodiment, the battery (i.e., battery 202, FIG. 2) can be separated into a first sub-battery and a second sub-battery connected in series and the neutral node N can be located between the first sub-battery and the second sub-battery.

FIG. 20B shows a branch 2010 of an active clamped multi-level inverter, in an embodiment. The active clamped multi-level inverter includes switches S1, S2, S3 and S4. A first clamping switch 2012 takes the place of the first diode D1 of FIG. 20A and a second clamping switch 2014 takes the place of the second diode D2 of FIG. 20A.

Figures 21, 22:
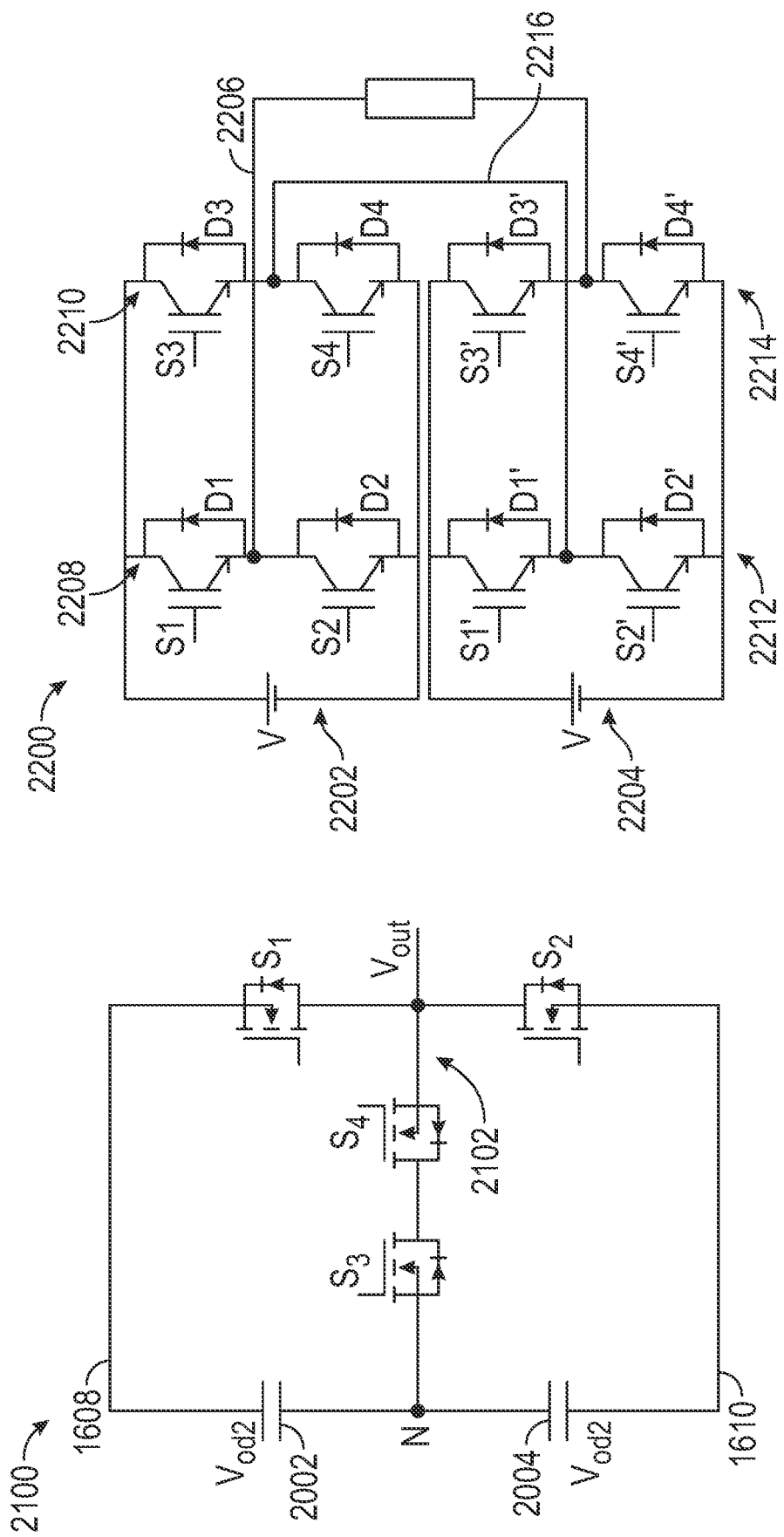
FIG. 21 shows a branch of a T-type multi-level inverter, in an embodiment.
FIG. 22 shows a cascaded H-bridge of a multi-level inverter in an embodiment.

FIG. 21 shows a branch 2100 of a T-type multi-level inverter, in an embodiment. The branch 2100 includes a first switch S1 and a second switch S2 connected in series between the positive bus 1608 and the negative bus 1610. A neutral line 2102 connects a node between the first switch S1 and the second switch S2 to a neutral node N. The neutral line 2102 includes switch S3 and switch S4, or a bidirectional switch, however this is not meant as a limitation.

FIG. 22 shows a cascaded H-bridge 2200 of a multi-level inverter in an embodiment. For illustrative purposes, the cascaded H-bridge 2200 includes a first H-type dual multi-level inverter 2202 and a second H-type dual multi-level inverter 2204. A first cascade line 2206 connects between switches of a first branch 2208 of the first H-type dual multi-level inverter 2202 to a second branch 2214 of the second H-type dual multi-level inverter 2204. A second cascade line 2216 connects between switches of a first branch 2212 of the second H-type dual multi-level inverter 2204 to a second branch 2210 of the first H-type dual multi-level inverter 2202.

In the inverters shown in FIGS. 16-22, the switches can be transistors or diodes, such as, but not limited to, Si IGBT transistors, anti-parallel diodes, SiC MOSFETs, SiC Schottky diodes, GaN switches/diodes, $Ga_2O_3$ switches/diodes, diamond-based power devices, etc.

Figure 23:
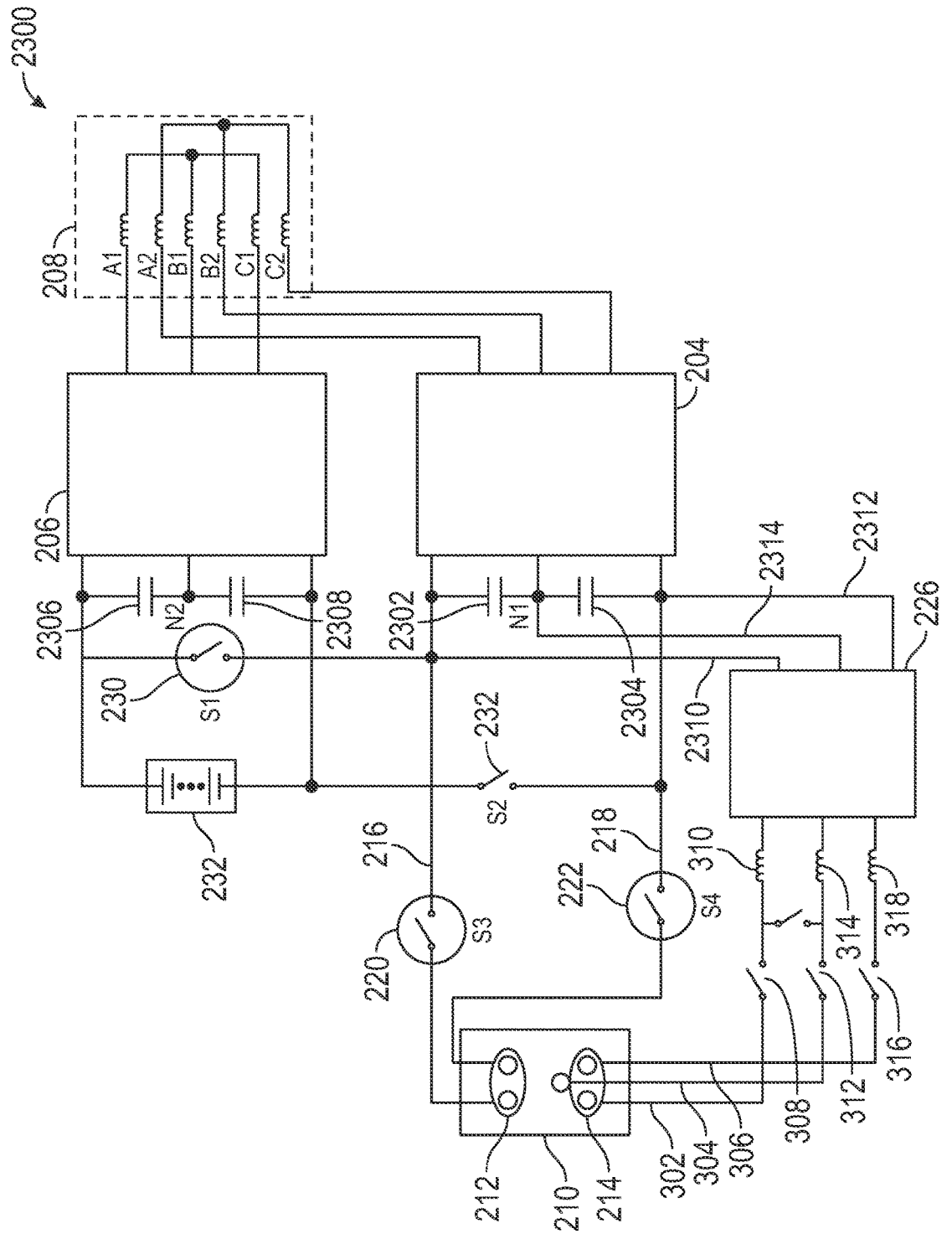
FIG. 23 shows a drive circuit of the drive system of the electric vehicle, in another embodiment.

FIG. 23 shows a drive circuit 2300 of the drive system 104 of the electric vehicle 100, in another embodiment. The drive circuit 2300 supports single-phase and three-phase AC charging. The drive circuit 2300 includes a power source or battery 202, a first inverter 204, a second inverter 206 and a winding machine 208. The first inverter 204 and the second inverter 206 are electrically separated from each other and can be powered using separate power modules and drivers. The first inverter 204 and the second inverter 206 each include a plurality of transistors or MOSFETs suitable for conversion between direct current (DC) and alternating current (AC). Each of the first inverter 204, the second inverter 206 and the front-end rectifier 226 can be a two-level inverter or a multi-level inverter, such as a Vienna rectifier, examples of which are shown in FIGS. 16-22.

The first inverter 204 can be used to convert between DC power at the external power grid 108 (FIG. 1) and AC power at the electric motor 106 (FIG. 1). The second inverter 206 can be used to convert between DC power at the battery 202 to AC power at the electric motor 106. The drive circuit 200 can be coupled to the external power grid 108 via a universal charger 210, which is an outlet of the external power grid that includes both a direct current port (DC port 212) and an alternating current port (AC port 214). The winding machine 208 is incorporated within the electric motor 106.

The drive circuit 2300 includes a high voltage DC bus 216 for connecting to a high voltage socket of the DC port 212 and a low voltage DC bus 218 for connecting to a low voltage socket of the DC port 212. A first DC port switch 220 controls a connection between the DC port 212 and the high voltage DC bus 216. A second DC port switch 222 controls a connection between the DC port 212 and the low voltage DC bus 218. The AC port 214 connects to the front-end rectifier 226 via a three-phase interface including a first bus 302, second bus 304 and third bus 306. The first bus 302 includes a first switch 308 and a first inductor 310. The second bus 304 includes a second switch 312 and a second inductor 314. The third bus 306 includes a third switch 316 and a third inductor 318.

A first pair of isolating capacitors 2302 and 2304 establish a first neutral node N1 between the high voltage DC bus 216 and the low voltage DC bus 218, thereby allowing for operation of the first inverter 204 as a multi-level inverter that employs the neutral point (e.g., T-type, diode-clamped, active clamped, etc.)

A second pair of isolating capacitors 2306 and 2308 establish a second neutral node N2 between a positive bus and a negative bus of battery 202, thereby allowing for operation of the second inverter 206 as a multi-level inverter that employs the neutral point (e.g., T-type, diode-clamped, active clamped, etc.)

The front-end rectifier 226 outputs to a positive voltage line 2310 which connects to the high voltage DC bus 216, a negative voltage line 2312 which connects to the low voltage DC bus 218, and a neutral voltage line 2314 that connects to the first neutral node N1. A switch 2320 between the low voltage DC bus 218 and the battery 202 can be opened to decouple the battery and the low voltage DC bus during operation of the front-end rectifier 226 during AC charging.

Figure 24:
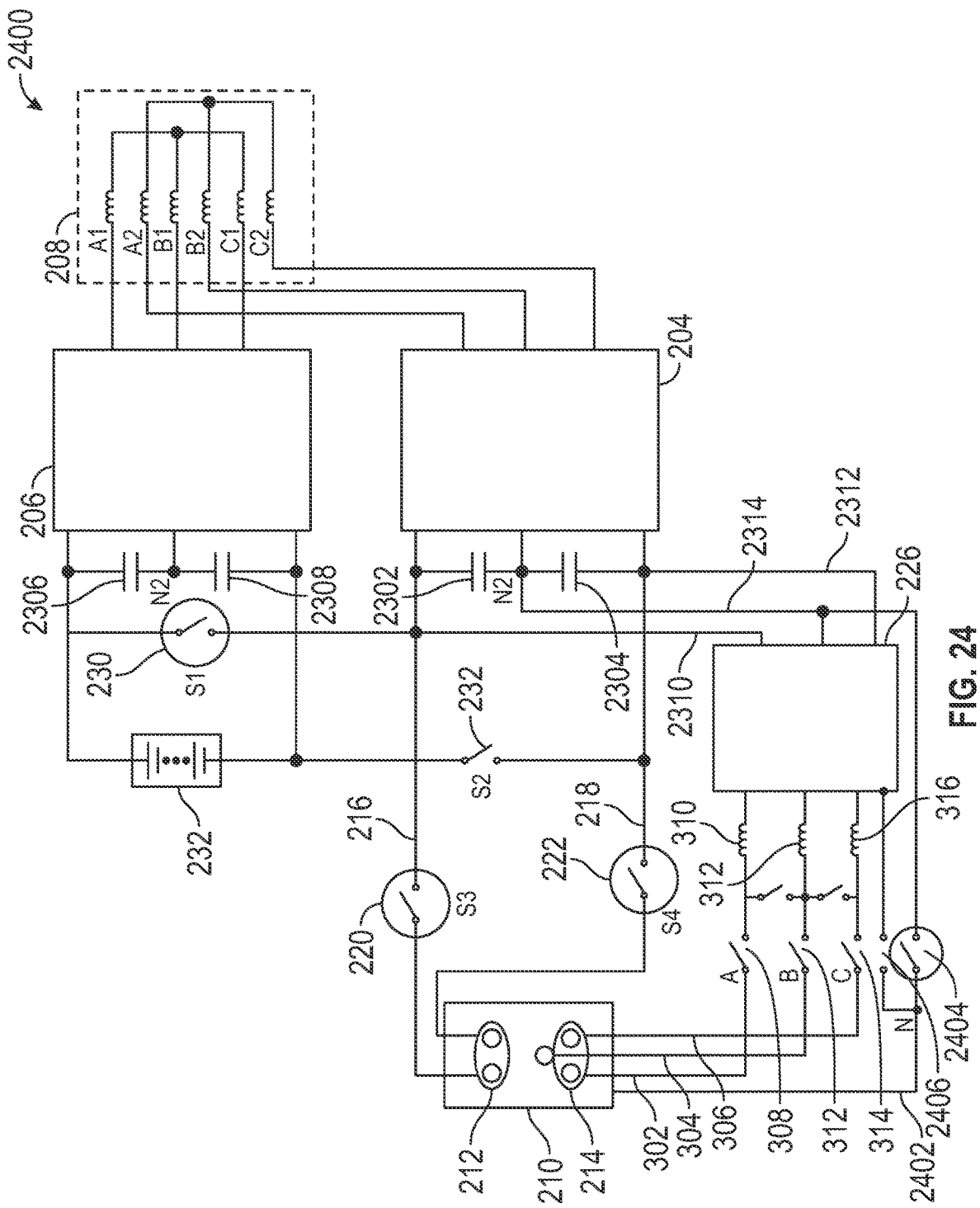
FIG. 24 shows a drive circuit of the drive system of the electric vehicle, in another embodiment.

FIG. 24 shows a drive circuit 2400 of the drive system 104 of the electric vehicle 100, in another embodiment. The drive circuit 2400 supports single-phase and three-phase AC charging where a neutral grid is directly connected to the neutral point of a DC-link capacitor to eliminate leakage current and to improve electromagnetic charging. The drive circuit 2400 includes the elements of drive circuit 2300 of FIG. 23 as well as a neutral line 2402 that connects from a neutral node of the universal charger 210 to the neutral voltage line 2314 and thus to first neutral node N1. The neutral line 2402 can also be connected as input to the front-end rectifier 226. A switch 2404 on the neutral line 2402 can open or close the connection to the first neutral node N1. Another switch 2406 on the neutral line 2402 can open or close the connection to the front-end rectifier 226.

Figure 25:
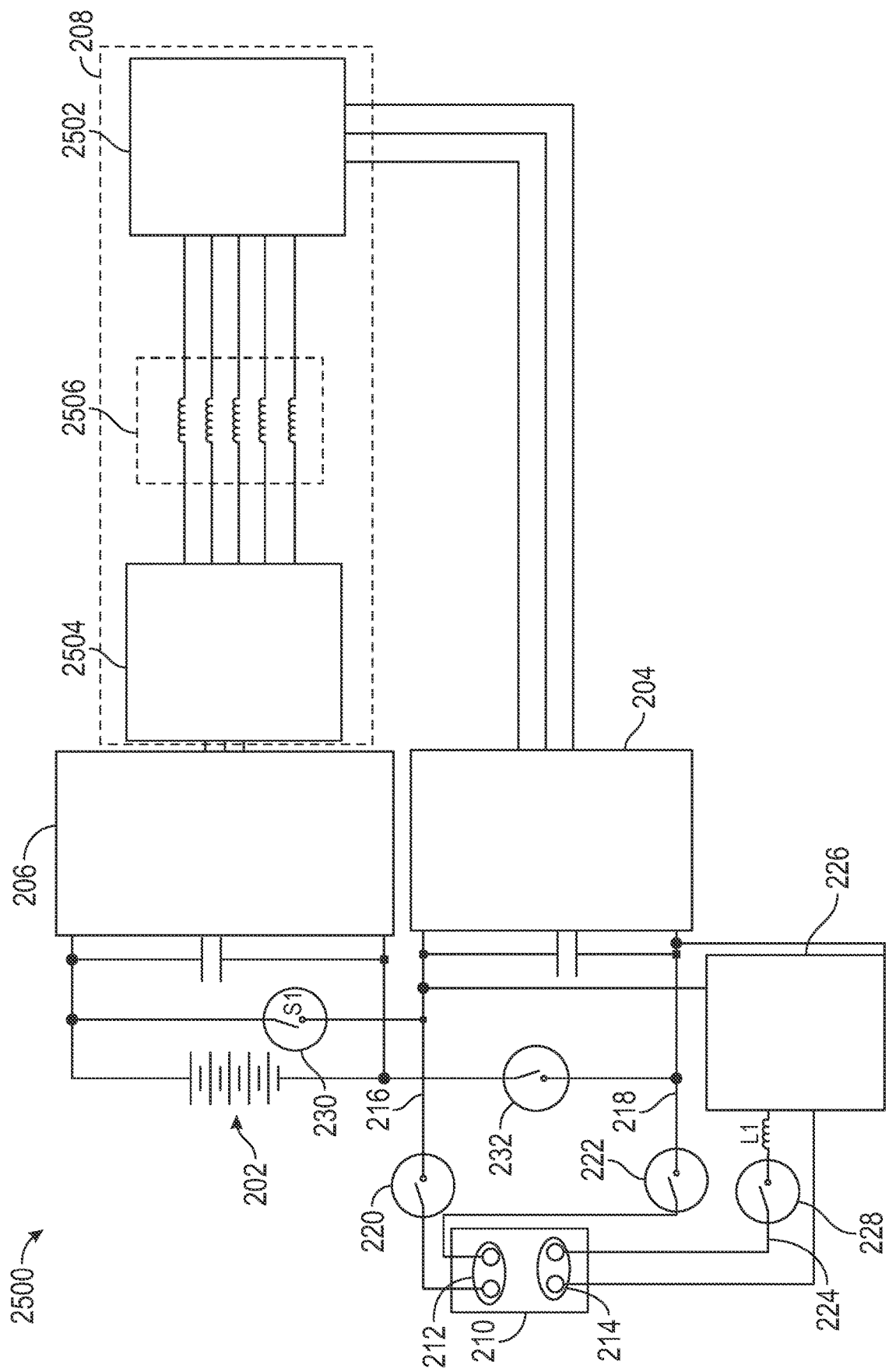
FIG. 25 shows a drive circuit of the drive system of the electric vehicle, in another embodiment.

FIG. 25 shows a drive circuit 2500 of the drive system 104 of the electric vehicle 100, in another embodiment. The drive circuit 2500 includes the elements of drive circuit 200 of FIG. 2. The winding machine 208 includes first interconnect 2502 connected to the first inverter 204 and a second interconnect 2504 connected to the second inverter 206. The winding machine 208 includes windings 2506 that connect between the first interconnect 2502 and the second interconnect 2504. The windings are groups according to battery-side windings and grid-side windings, whereas each battery-side winding is paired with a grid-side winding. The windings can be adjustable windings in which the turn ratios (such as between battery-side winding and its associated grid-side winding A2 can be adjusted to raise or lower a voltage transfer through the winding machine 208. For example, the winding pair can be configured and interconnected to have different turn ratios (i.e., both integral turn ratios such as 1:1, 2:3, 3:2, 1:3, 3:1, etc. and fractional turns ratio such as 1:1.2, 2.5:1, etc.). The turns ratio can be selected to allow charging of the battery 202 at different state of the charge (SOC) from different grid side voltages at AC port 214.

It is noted that the invention is discussed primarily with respect to a power grid but can be used with respect to any external device. A "grid side" can refer to an "external side" when the invention is used with a respect to any external device.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of transferring power between a vehicle and an external location, comprising:
   connecting a rectifier to an alternating current (AC) port of an outlet of the external location, wherein the rectifier is one of a two-level rectifier and a multi-level rectifier;
   connecting a DC side of the rectifier to a DC side of a first inverter, wherein an AC side of the first inverter is coupled to a first winding group of a winding machine;
   connecting a DC side of a second inverter to a battery of the vehicle, wherein an AC side of the second inverter is coupled to a second winding group of the winding machine;
   converting between an AC power at the AC port on an external side of the rectifier and a direct current (DC) power at a vehicle side of the rectifier;
   converting from DC power to AC power at the first inverter and the first winding;
   inducing AC power in the second winding from the AC power in the first winding; and
   converting AC power at the second winding to DC power at the second inverter to power the battery.

2. The method of claim 1, wherein the first inverter is one of a two-level inverter and a multi-level rectifier and the second inverter is one of a two-level rectifier and a multi-level rectifier.

3. The method of claim 2, further comprising disconnecting the rectifier from the AC port and connecting the first inverter to a DC port of the outlet for DC power transfer.

4. The method of claim 2, wherein the winding machine is an electric motor of the vehicle and the method further comprises disengaging the electric motor from the vehicle for power transfer.

5. The method of claim 2, further comprising connecting a drive system of the vehicle between the AC port and the first inverter and using an inverter of the drive system as the rectifier and a machine winding of the drive system as an inductor.

6. The method of claim 1, further comprising transferring the power with the rectifier in one of: (i) a three-phase configuration; and (ii) a single-phase configuration.

7. A drive system of an electric vehicle, comprising:
a battery;
a winding machine having a first winding group and a second winding group;
a rectifier connectable to an alternating current (AC) port of an outlet to an external location, wherein the rectifier is one of a two-level rectifier and a multi-level rectifier; and
a first inverter having a DC side to the rectifier and an AC side coupled to the first winding group;
a second inverter having an AC side coupled to the second winding group and aa DC side coupled to the battery;
a processor configured to create a connection between the rectifier and the AC port, thereby allowing conversion between an AC power at the AC port on an external side of the rectifier and a direct current (DC) power at a vehicle side of the rectifier, conversion from DC power to AC power at the first inverter and the first winding, induction of AC power in the second winding from the AC power in the first winding, and conversion of AC power at the second winding to DC power at the second inverter to power the battery.

8. The drive system of claim 7, wherein the first inverter is one of a two-level inverter and a multi-level inverter and the second inverter is one of a two-level inverter and a multi-level inverter.

9. The drive system of claim 8, wherein the processor is further configured to disconnect the rectifier from the AC port and connect the first inverter to a DC port of the outlet to allow DC power transfer.

10. The drive system of claim 8, wherein the winding machine is an electric motor of the vehicle and the processor is further configured to disengage the electric motor from the vehicle for power transfer.

11. The drive system of claim 8, further comprising a second drive system located in series between the AC port and first inverter, wherein an inverter of the second drive system is used as the rectifier and a machine winding of the second drive system is used as an inductor between the AC port and the rectifier and the inverter of the second drive system is one of a two-level inverter and a multi-level inverter.

12. The drive system of claim 8, wherein the rectifier is operated in one of: (i) a three-phase configuration; and (ii) a single-phase configuration.

13. The drive system of claim 8, wherein a neutral node for the second inverter is located at one of: (i) between two capacitors isolating the neutral node from a positive bus and a negative bus of the battery; and (ii) between a first sub-battery and a second sub-battery connected in series.

14. The drive system of claim 8, wherein the winding machine includes a battery side winding and a grid side winding and a turn ratio between the battery side winding and the grid side winding is adjustable to a selected value.

15. An electric vehicle, comprising:
a battery;
a winding machine having a first winding group and a second winding group;
a rectifier connectable to an alternating current (AC) port of an outlet to an external location, wherein the rectifier is one of a two-level rectifier and a multi-level rectifier;
a first inverter having a DC side to the rectifier and an AC side coupled to the first winding group;
a second inverter having an AC side coupled to the second winding group and aa DC side coupled to the battery;
a processor configured to create a connection between the rectifier and the AC port, thereby allowing conversion from DC power to AC power at the first inverter and the first winding, induction of AC power in the second winding from the AC power in the first winding, and conversion of AC power at the second winding to DC power at the second inverter to power the battery.

16. The electric vehicle of claim 15, wherein the first inverter is one of a two-level inverter and a multi-level inverter and the second inverter is one of a two-level inverter and a multi-level inverter.

17. The electric vehicle of claim 16, wherein the processor is further configured to disconnect the rectifier from the AC port and connect the first inverter to a DC port of the outlet to allow DC power transfer.

18. The electric vehicle of claim 16, wherein the winding machine is an electric motor of the vehicle and the processor is further configured to disengage the electric motor from the vehicle for power transfer.

19. The electric vehicle of claim 16, further comprising a drive system located in series between the AC port and the first inverter, wherein an inverter of the drive system is used as the rectifier and a machine winding of the drive system is used as an inductor between the AC port and the rectifier and the inverter of the drive system is one of a two-level inverter and a multi-level inverter.

20. The electric vehicle of claim 16, wherein the rectifier is operated in one of: (i) a three-phase configuration; and (ii) a single-phase configuration.

* * * * *